(12) United States Patent
Kawahira et al.

(10) Patent No.: US 11,822,181 B1
(45) Date of Patent: Nov. 21, 2023

(54) LIQUID CRYSTAL DISPLAY DEVICE COMPRISING A PRISM SHEET AND HAVING A LIGHT DIFFUSION PROPERTY CURVE OBTAINED BY PLOTTING A LUMINANCE IN A WHITE DISPLAY STATE

(71) Applicant: Sharp Display Technology Corporation, Kameyama (JP)

(72) Inventors: Yuichi Kawahira, Kameyama (JP); Masahiro Hasegawa, Kameyama (JP); Ryosuke Saigusa, Kameyama (JP); Akira Sakai, Kameyama (JP)

(73) Assignee: Sharp Display Technology Corporation, Mie (JP)

( * ) Notice: Subject to any disclaimer, the term of this patent is extended or adjusted under 35 U.S.C. 154(b) by 0 days.

(21) Appl. No.: 18/195,848

(22) Filed: May 10, 2023

(30) Foreign Application Priority Data

May 17, 2022 (JP) ................... 2022-080938

(51) Int. Cl.
*G02F 1/1335* (2006.01)
*G02F 1/13363* (2006.01)

(52) U.S. Cl.
CPC .... *G02F 1/133531* (2021.01); *G02F 1/13363* (2013.01); *G02F 1/133607* (2021.01)

(58) Field of Classification Search
CPC ................................................. G02F 2413/12
See application file for complete search history.

(56) References Cited

U.S. PATENT DOCUMENTS

| 2011/0304528 | A1* | 12/2011 | Murata | G02F 1/134363 345/102 |
| 2013/0148053 | A1* | 6/2013 | Minoura | G02B 1/118 349/96 |
| 2015/0062491 | A1* | 3/2015 | Sakuragi | G02F 1/1336 349/64 |

FOREIGN PATENT DOCUMENTS

| JP | 2008026781 A | * | 2/2008 |
| WO | 2012/090769 A1 | | 7/2012 |

* cited by examiner

*Primary Examiner* — Paul C Lee
(74) *Attorney, Agent, or Firm* — ScienBiziP, P.C.

(57) ABSTRACT

Provided is a liquid crystal display device sequentially including: a first polarizer; a liquid crystal panel; a second polarizer; a biaxial retarder; a third polarizer; and a backlight including a light source and a prism sheet disposed closer to the viewing surface side than the light source is. The prism sheet includes prisms arranged in multiple columns on a surface close to the viewing surface side. The liquid crystal display has a light diffusion property curve having no side lobe or having a side lobe satisfying a ratio of a local maximum luminance to a local minimum luminance of 1.35 or less, the light diffusion property curve being obtained by plotting a luminance in a white display state in a direction perpendicular to ridge lines of the prisms against a polar angle.

5 Claims, 31 Drawing Sheets

LIQUID CRYSTAL DISPLAY DEVICE COMPRISING A PRISM SHEET AND HAVING A LIGHT DIFFUSION PROPERTY CURVE OBTAINED BY PLOTTING A LUMINANCE IN A WHITE DISPLAY STATE

CROSS-REFERENCE TO RELATED APPLICATIONS

The present application claims priority under 35 U.S.C. § 119 to Japanese Patent Application No. 2022-080938 filed on May 17, 2022, the contents of which are incorporated herein by reference in their entirety.

BACKGROUND OF THE INVENTION

Field of the Invention

The following disclosure relates to liquid crystal display devices.

Description of Related Art

A liquid crystal display device is a display device that uses a liquid crystal composition for display. A typical display method thereof includes applying voltage to a liquid crystal layer containing a liquid crystal composition sealed between a pair of substrates to change the alignment state of liquid crystal molecules in the liquid crystal composition depending on the applied voltage, thereby controlling the transmission amount of light. Such liquid crystal display devices are used in a wide range of fields, taking advantage of their features such as thin profile, light weight, and low power consumption. Optical elements are sometimes used in such liquid crystal display devices for the purpose of improving the contrast ratio.

WO 2012/090769 discloses, as an art concerning liquid crystal display devices, an optical element including a first polarizer, a birefringent layer, and a second polarizer, wherein the first polarizer, the birefringent layer, and the second polarizer are stacked in this order, the first polarizer has a transmission axis parallel to a transmission axis of the second polarizer, the birefringent layer has a biaxial parameter NZ satisfying 10≤NZ or NZ≤9, and the birefringent layer provides a retardation |Rth| in a thickness direction satisfying |Rth|≥200 nm in absolute value.

BRIEF SUMMARY OF THE INVENTION

Liquid crystal display devices are roughly classified into reflective liquid crystal display devices and transmissive liquid crystal display devices depending on the method of transmitting light through the liquid crystal layer. Transmissive liquid crystal display devices include a backlight including a light source, and performs display by transmitting light emitted from the backlight through a liquid crystal layer. Including a light source inside thereof, transmissive liquid crystal display devices ensure good visibility even in a dark environment. A backlight in such transmissive liquid crystal display devices may include a prism sheet disposed closer to the viewing surface side than the light source is with an aim of focusing light from the light source to the front. In liquid crystal display devices including a backlight with a prism sheet, the front contrast ratio (CR) can be increased.

Vehicle-mounted liquid crystal display devices (also referred to as in-vehicle liquid crystal displays) are often viewed from an oblique direction from a seat, as typical for a center display, and therefore the oblique CR tends to be considered more important than the front CR. In Europe, strict OEM standard values are provided for the oblique luminance and the oblique CR. Application of a polarizer louver that can reduce or prevent light leakage in an oblique direction in a black display state to an in-vehicle liquid crystal display equipped with a backlight that includes a single prism sheet undesirably decreases the oblique CR.

The presence of side lobes generated by the prism sheet is one cause of a decrease in oblique CR when the polarizer louver is applied. Side lobes are caused by a light component (side lobe light) generated by the following mechanism. At an azimuth perpendicular to the ridge lines of prisms of the prism sheet, the prism sheet fails to focus a large-polar-angle light component, among the light emitted from the backlight, to the front, and the large-polar-angle light component is emitted from the prism sheet at a still larger polar angle as side lobe light. The side lobe light is essentially an unnecessary light component and tends to become stray light in the liquid crystal panel, which causes light leakage in a black display state and decreases the oblique CR.

The present invention has been made under the current situation and aims to provide a liquid crystal display device capable of reducing or preventing a decrease in front contrast ratio as well as a decrease in oblique contrast ratio.

(1) One embodiment of the present invention is directed to a liquid crystal display device sequentially including from a viewing surface side towards a back surface side: a first polarizer having a first transmission axis; a liquid crystal panel; a second polarizer having a second transmission axis; a biaxial retarder having a slow axis parallel to the second transmission axis; a third polarizer having a third transmission axis parallel to the second transmission axis; and a backlight including a light source and a prism sheet disposed closer to the viewing surface side than the light source is, wherein the prism sheet includes prisms arranged in multiple columns on a surface close to the viewing surface side, and the liquid crystal display device has a light diffusion property curve having no side lobe or having a side lobe satisfying a ratio of a local maximum luminance to a local minimum luminance of 1.35 or less, the light diffusion property curve being obtained by plotting a luminance in a white display state in a direction perpendicular to ridge lines of the prisms against a polar angle.

(2) In an embodiment of the present invention, the liquid crystal display device includes the structure (1), and the ridge lines of the prisms have an azimuthal angle of 0°±3° where a direction parallel to the slow axis of the biaxial retarder is set to have an azimuthal angle of 0°.

(3) In an embodiment of the present invention, the liquid crystal display device includes the structure (1) or (2), the prisms each have a triangular cross-sectional shape having an apex angle close to the viewing surface side and a pair of base angles close to the back surface side in a direction perpendicular to the ridge lines, and the apex angle is not smaller than 80° but smaller than 90°.

(4) In an embodiment of the present invention, the liquid crystal display device includes the structure (1) or (2), and the backlight further includes a diffuser sheet disposed closer to the viewing surface side than the prism sheet is.

(5) In an embodiment of the present invention, the liquid crystal display device includes the structure (4), and the diffuser sheet has a haze of 12% or higher and 85% or lower.

The present invention can provide a liquid crystal display device capable of reducing or preventing a decrease in front contrast ratio as well as a decrease in oblique contrast ratio.

DETAILED DESCRIPTION OF THE INVENTION

Figure 1:
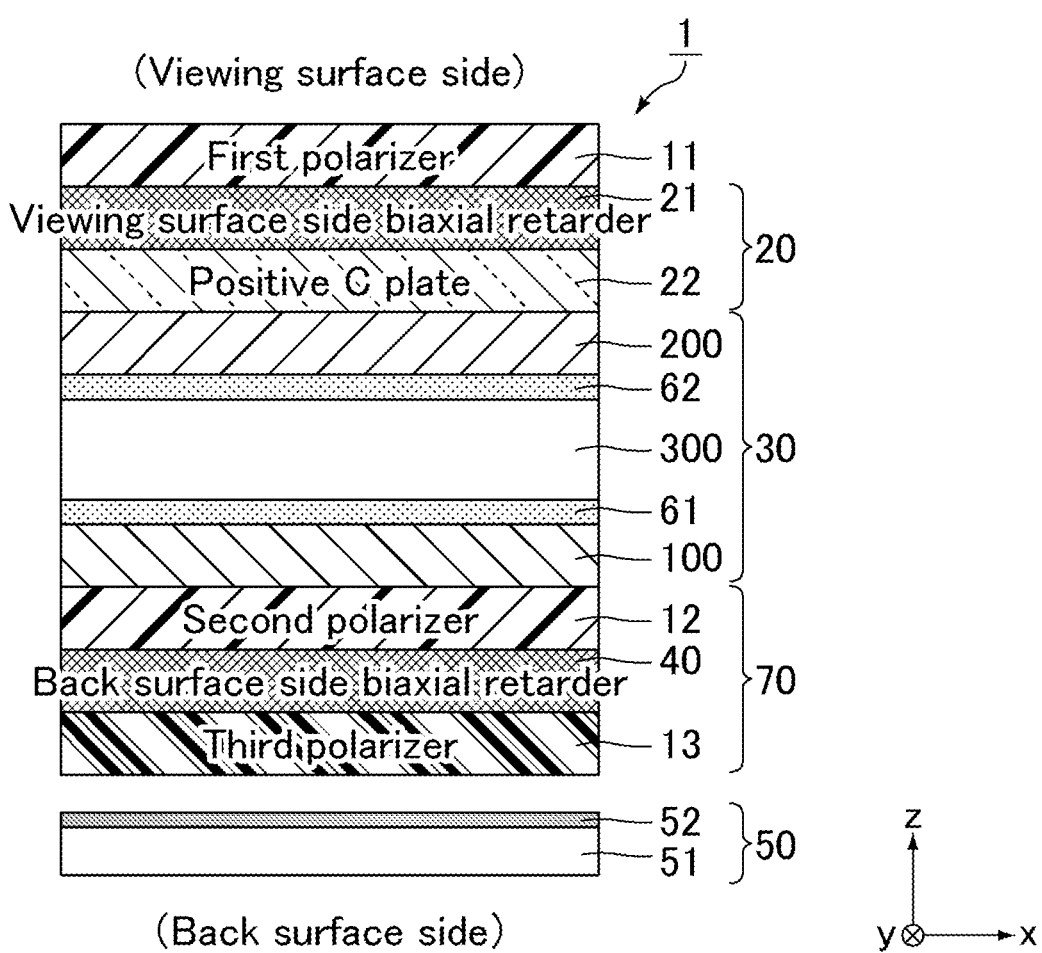
FIG. 1 is a schematic cross-sectional view of a liquid crystal display device of Embodiment 1.

Hereinafter, embodiments of the present invention are described in more detail below with reference to the drawings.

The present invention is not limited only to these embodiments.

Term Definition

Herein, a "polarizer" means one having a function of filtering unpolarized light (natural light), partially polarized light, or polarized light into polarized light (linearly polarized light) vibrating only in a specific direction. Such a polarizer is distinctive from a circular polarizer (a circularly polarizing plate). Unless otherwise noted, a "polarizer" herein indicates an element having a polarizing function and does not include protective film(s). An "absorptive polarizer" means one having a function of absorbing light vibrating in a specific direction while transmitting polarized light (linearly polarized light) vibrating in a direction perpendicular to the specific direction. A "reflective polarizer" means one having a function of reflecting light vibrating in a specific direction while transmitting polarized light (linearly polarized light) vibrating in a direction perpendicular to the specific direction.

A birefringent layer herein provides a retardation Re in the in-plane direction defined by Re=(nx−ny)×d, a retardation Rth in the thickness direction defined by Rth=[{(nx+ny)/2}−nz]×d, and an NZ factor (biaxial parameter) defined by NZ=(nz−nx)/|ny−nx|. In the formulas, d represents the thickness of the birefringent layer; nx represents a refractive index in a direction in which the refractive index in the in-plane direction of a refractive index ellipsoid becomes the maximum (i.e., the slow axis direction); ny represents a refractive index in the direction perpendicular to the slow axis in the plane; and nz represents the refractive index in the thickness direction.

The measurement wavelength for a principal refractive index, a retardation, an NZ factor, and other optical parameters herein is 550 nm, unless otherwise specified.

A birefringent layer herein indicates an optically anisotropic layer and conceptually includes a retarder and a liquid crystal panel. A birefringent layer means a layer that provides one of the retardation Re in the in-plane direction and the retardation Rth in the thickness direction satisfying 10 nm or more, preferably 20 nm or more in absolute value.

Herein, a "viewing surface side" means the side closer to the screen (display surface) of the liquid crystal display device. A "back surface side" means the side further from the screen (display surface) of the liquid crystal display device.

Herein, a polar angle θ means an angle formed between the direction in question (e.g., measurement direction) and a direction parallel to the normal of the liquid crystal display device (screen of the liquid crystal display device). In other words, the direction parallel to the normal of the liquid crystal display device has a polar angle of 0°. The direction parallel to the normal is also called the normal direction. The azimuth means the direction in question in a view projected onto the liquid crystal display device (the screen of the liquid crystal display device) and is expressed as an angle (azimuthal angle) formed with the reference azimuth. The reference azimuth (azimuthal angle of 0°) herein is set in the direction parallel to the second transmission axis of the second polarizer. In other words, the direction parallel to the second transmission axis of the second polarizer has an azimuthal angle of 0°. The angle and azimuth (azimuthal angle) measures positive in the counterclockwise direction and negative in the clockwise direction from the reference azimuth. The counterclockwise and clockwise directions mean rotation directions when the screen of the liquid crystal display device is viewed from the viewing surface side (front side). An angle indicates a value measured in a plan view of the liquid crystal display device. A state where two straight lines (including axes, directions, and ridge lines) are perpendicular to each other means that the lines are perpendicular to each other in a plan view of the liquid crystal display device.

Hereinafter, embodiments of the present invention are described. The embodiments, however, are not intended to limit the scope of the present invention. The designs in the embodiments may appropriately be modified within the spirit of the present invention.

Embodiment 1

FIG. 1 is a schematic cross-sectional view of a liquid crystal display device of Embodiment 1. As shown in FIG. 1, a liquid crystal display device 1 of the present embodiment sequentially includes from a viewing surface side towards a back surface side: a first polarizer 11 having a first transmission axis; a liquid crystal panel 30; a second polarizer 12 having a second transmission axis; a back surface side biaxial retarder 40 as the biaxial retarder having a slow axis parallel to the second transmission axis; a third polarizer 13 having a third transmission axis parallel to the second transmission axis; and a backlight 50 including a light source 51 and a prism sheet 52 disposed closer to the viewing surface side than the light source 51 is. As above, the backlight 50 of the present embodiment including the prism sheet 52 can improve the front contrast ratio (CR).

The prism sheet 52 in the liquid crystal display device 1 of the present embodiment includes prisms arranged in multiple columns on a surface close to the viewing surface side, and the liquid crystal display device 1 has a light diffusion property curve having no side lobe or having a side lobe satisfying a ratio of a local maximum luminance to a local minimum luminance of 1.35 or less. The light diffusion property curve (vertical axis: luminance in a white display state, horizontal axis: polar angle) is obtained by plotting the luminance in a white display state in a direction perpendicular to the ridge lines of the prisms against the polar angle (−90° to 90°). Such an embodiment can reduce or prevent a decrease in oblique CR.

Figure 2:
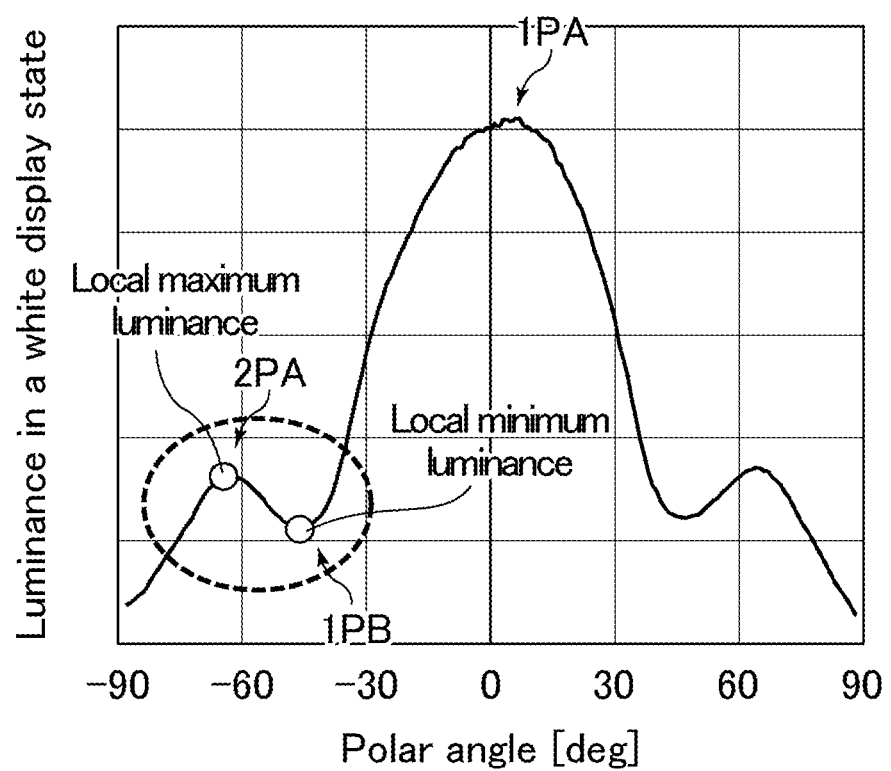
FIG. 2 is a chart for illustrating a side lobe.

FIG. 2 is a chart for illustrating a side lobe. As shown in FIG. 2, the side lobe refers to a peak including: a local minimum point 1PB adjacent to a first local maximum point 1PA that has a largest local maximum value; and a second local maximum point 2PA adjacent to the local minimum point 1PB and having a smaller local maximum value than the first local maximum point 1PA, and not including: a local minimum point other than the local minimum point 1PB; and a local maximum point other than the second local maximum point 2PA in the light diffusion property curve obtained by plotting the luminance in a white display state in the direction perpendicular to the ridge lines of the prisms of the prism sheet against the polar angle. The luminance at the local minimum point 1PB is also called a side lobe local minimum luminance, and the luminance at the second local maximum point 2PA is also called a side lobe local maximum luminance.

When the liquid crystal display device 1 has a side lobe, the ratio of the local maximum luminance to the local minimum luminance of the side lobe is preferably 1.20 or less. Such an embodiment can further reduce or prevent a decrease in oblique CR. The lower limit of the ratio of the local maximum luminance to the local minimum luminance of the side lobe is not limited, and exceeds 1.00, for example. The ratio of the local maximum luminance to the local minimum luminance of the side lobe is preferably more than 1.00 and not more than 1.35, more preferably more than 1.00 and not more than 1.20. In this specification, having no side lobe means that the local maximum luminance and the local minimum luminance have the same value. Accordingly, in the case of the light diffusion property curve having no side lobe, a ratio of the local maximum luminance to the local minimum luminance of a side lobe is 1.00.

WO 2012/090769 discloses a liquid crystal panel to which a polarizer louver is applied. In WO 2012/090769, improvement of the front CR by means of the polarizer louver is studied, but improvement of the oblique CR is not studied. WO 2012/090769 does not at all disclose that optimization of the light distribution property of the backlight as in the present embodiment imparts the CR improving effect of the polarizer louver even in an oblique direction.

The liquid crystal display device of the present embodiment will be described in detail below.

As shown in FIG. 1, the liquid crystal display device 1 of the present embodiment sequentially includes from the viewing surface side towards the back surface side, the first polarizer 11, a viewing angle compensating retardation film 20, the liquid crystal panel 30, the second polarizer 12, the back surface side biaxial retarder 40, the third polarizer 13, and the backlight (BL) 50. The viewing angle compensating retardation film 20 sequentially includes from the viewing surface side towards the back surface side: a viewing surface side biaxial retarder 21; and a positive C plate 22.

The first polarizer 11 has a first transmission axis and a first absorption axis perpendicular to the first transmission axis or a first reflection axis perpendicular to the first transmission axis. The second polarizer 12 has a second transmission axis and a second absorption axis perpendicular to the second transmission axis or a second reflection axis perpendicular to the second transmission axis. The third polarizer 13 has a third transmission axis and a third absorption axis perpendicular to the third transmission axis or a third reflection axis perpendicular to the third transmission axis.

The second polarizer 12 and the third polarizer 13 are arranged in parallel Nicols. In other words, the second transmission axis (or the second absorption axis or the second reflection axis) of the second polarizer 12 and the third transmission axis (or the third absorption axis or the third reflection axis) of the third polarizer 13 are parallel to each other.

Herein, the expression that two axes (directions) are "parallel" means an angle (absolute value) formed by the two is within the range of 0°±3°, preferably within the range of 0°±1°, more preferably within the range of 0°±0.5°, particularly preferably 0° (perfectly parallel). The expression that two axes (directions) are "perpendicular" to each other means that the angle (absolute value) formed by the two is within the range of 90°±3°, preferably within the range of 90°±1°, more preferably within the range of 90°±0.5°, particularly preferably 90° (completely perpendicular). Examples of the axes include the transmission axis of the polarizer and the slow axis of the retarder.

The liquid crystal display device 1 includes the second polarizer 12 having a second transmission axis, the back surface side biaxial retarder 40, and the third polarizer 13 having a third transmission axis parallel to the second transmission axis. The liquid crystal display device 1 thus can use collimation in which the distribution of light emitted from the backlight 50 is selectively focused to the normal direction, the second transmission axis direction (the third transmission axis direction), and the second absorption axis direction or the second reflection axis direction (the third absorption axis direction or the third reflection axis direction) (cross light distribution). As for light entering from other oblique directions such as directions at azimuthal angles of 45°, 135°, 225°, and 315°, i.e., the directions that form an angle of about 45° with the second transmission axis direction (third transmission axis direction), the back surface side biaxial retarder 40 changes the polarization state of light having passed through the third polarizer 13, leading to observation of a low transmittance. A stack of the second polarizer 12, the back surface side retarder 40, and the third polarizer 13 functions as an optical louver and is also called a polarizer louver 70. The polarizer louver 70 is usually attached to the liquid crystal panel 30 with an adhesive layer (not shown).

The first polarizer 11 and the second polarizer 12 are arranged in crossed Nicols or parallel Nicols. In order to achieve a high contrast ratio, the first polarizer 11 and the second polarizer 12 are preferably arranged in crossed Nicols. The expression that the first polarizer 11 and the second polarizer 12 are arranged in crossed Nicols means that the first transmission axis (or the first absorption axis or the first reflection axis) of the first polarizer 11 and the second transmission axis (or the second absorption axis or the second reflection axis) of the second polarizer 12 are perpendicular to each other. The expression that the first polarizer 11 and the second polarizer 12 are arranged in parallel Nicols means that the first transmission axis (or the first absorption axis or the first reflection axis) of the first polarizer 11 and the second transmission axis (or the second absorption axis or the second reflection axis) of the second polarizer 12 are parallel to each other.

The first polarizer 11, the second polarizer 12, and the third polarizer 13 are not limited in terms of their materials or optical performance. Any polarizers such as absorptive polarizers or reflective polarizers can be used as appropriate. Specific examples thereof include an absorptive polarizer obtained by adsorbing a dichroic anisotropic material such as an iodine complex on a polyvinyl alcohol (PVA) film and aligning the material, a reflective polarizer obtained by uniaxially stretching a co-extruded film made of two types of resins (e.g., APCF available from Nitto Denko Corporation, DBEF available from 3M Company), and a reflective polarizer including periodic arrays of metal thin lines (i.e., wire grid polarizer). A stack of an absorptive polarizer and a reflective polarizer may also be used.

Among these, an absorptive polarizer is suitable for the first polarizer 11 and the second polarizer 12, and a reflective polarizer is suitable for the third polarizer 13. In this case, the first polarizer 11 has a first transmission axis and a first absorption axis perpendicular to the first transmission axis. The second polarizer 12 has a second transmission axis and a second absorption axis perpendicular to the second transmission axis. The third polarizer 13 has a third transmission axis and a third reflection axis perpendicular to the third transmission axis.

A diffuser is preferably provided between the third polarizer 13 and the backlight 50. Such an embodiment can improve the use efficiency of light emitted from the backlight 50.

The polarizer louver 70 may include multiple third polarizers 13, and a stack of multiple third polarizers 13 may be used. In this case, the third transmission axes of the third polarizers 13 are set at substantially the same azimuth.

A protective film (not shown) such as a triacetyl cellulose (TAC) film may be laminated on at least one of the viewing surface side surface or the back surface side surface of each of the first polarizer 11, the second polarizer 12, and the third polarizer 13 for sufficient mechanical strength and sufficient moisture and heat resistance. The protective films are attached to the first polarizer 11, the second polarizer 12, and the third polarizer 13 via any suitable bonding layer (not shown).

A protective film having the function of the back surface side biaxial retarder 40 may replace the back surface side biaxial retarder 40. In other words, the back surface side biaxial retarder 40 may be a protective film such as a TAC film (wherein one of the retardation Re in the in-plane direction and the retardation Rth in the thickness direction satisfies 10 nm or more in absolute value).

The "bonding layer" herein means a layer that bonds the surfaces of adjacent optical elements and thereby integrates them with a practically sufficient adhesiveness in a practically sufficient bonding time. Examples of the material of the bonding layer include adhesives and anchor coating agents. The bonding layer may have a multilayer structure in which an anchor coating layer is formed on the surface of a bonding target and a bonding agent layer is formed on the anchor coating layer. The bonding layer may be a thin layer invisible with the naked eye.

As with the "bonding layer", the "adhesive layer" herein is a layer that bonds the surfaces of adjacent optical elements and integrates them with a practically sufficient adhesiveness in a practically sufficient bonding time. One difference from the bonding layer is that the layer itself has adhesiveness and elasticity and thus can bond the objects with a slight pressure for a while at room temperature without a chemical reaction caused by a factor such as water, a solvent, or heat. Another difference is that objects attached by a bonding layer cannot be separated, while objects attached by an adhesive layer can be separated. Examples of the material of the adhesive layer include resins including acrylic resin, silicone resin, and urethane resin and rubber materials.

The viewing angle compensating retardation film 20 including the viewing surface side biaxial retarder 21 and the positive C plate 22 has a function of compensating for the viewing angle of a fringe field switching (FFS) mode liquid crystal display device.

The biaxial retarder (the viewing surface side biaxial retarder 21 and the back surface side biaxial retarder 40) has three main refractive indexes nx, ny, and nz in x-, y-, and z-axis directions mutually perpendicular to each other, and satisfy nx>nz>ny and (nx−nz)/|nx−ny|=0.1.

The viewing surface side biaxial retarder 21 and the back surface side biaxial retarder 40 each may be formed from any material. For example, a stretched polymer film, a film made of a liquid crystalline material whose alignment is fixed, or a thin plate made of an inorganic material can be used.

The viewing surface side biaxial retarder 21 and the back surface side biaxial retarder 40 each may be formed by any method. When it is formed from a polymer film, for example, a method such as solvent casting or melt extrusion can be used. Also, co-extrusion may be used to form a plurality of retarders simultaneously. The retarder(s) may or may not be stretched as long as the desired retardation is introduced. The stretching method may be any method such as tensile stretching between rolls, compression stretching between rolls, tenter transverse uniaxial stretching, oblique stretching, vertical and transverse biaxial stretching, or special stretching where a film is stretched under the shrinkage stress of a heat shrinkable film.

When it is formed from a liquid crystalline material, for example, a method can be used such as a method including applying a liquid crystal material to a base film having undergone an alignment treatment and fixing the alignment of the material. The method may be one including no special alignment treatment on a base film or one including removing the liquid crystalline material from the base film after the alignment fixation and transferring the material to another film, as long as the desired retardation is introduced. A method may also be used which includes no fixation of the alignment of a liquid crystalline material. When it is formed from a non-liquid crystalline material, the same formation method as when it is formed from a liquid crystalline material may be used.

The positive C plate 22 can appropriately be, for example, a film containing a material with a negative intrinsic birefringence as its component and having been subjected to vertical and transverse biaxial stretching, or a film to which a liquid crystalline material such as nematic liquid crystal has been applied.

The azimuthal angle of the first transmission axis of the first polarizer 11 can be set as appropriate. The azimuthal angle is set preferably within the range of 90°±3°, more preferably within the range of 90°±1°, still more preferably within the range of 90°±0.5°, particularly preferably at 90°, where the azimuthal angle of the direction parallel to the second transmission axis of the second polarizer 12 is 0°. The azimuthal angle of the slow axis of the back surface side biaxial retarder 40 and the azimuthal angle of the third transmission axis of the third polarizer 13 are each independently set within the range of 0°±3°, preferably within the range of 0°±1°, more preferably within the range of 0°±0.5°, particularly preferably at 0°. The azimuthal angle of the slow axis of the liquid crystal layer 300 is set within the range of 90°±3°, preferably within the range of 90°±1°, more preferably within the range of 90°±0.5°, particularly preferably at 90°.

The slow axis of the viewing surface side biaxial retarder 21 and the slow axis of the back surface side biaxial retarder 40 are preferably perpendicular to each other.

Figure 3:
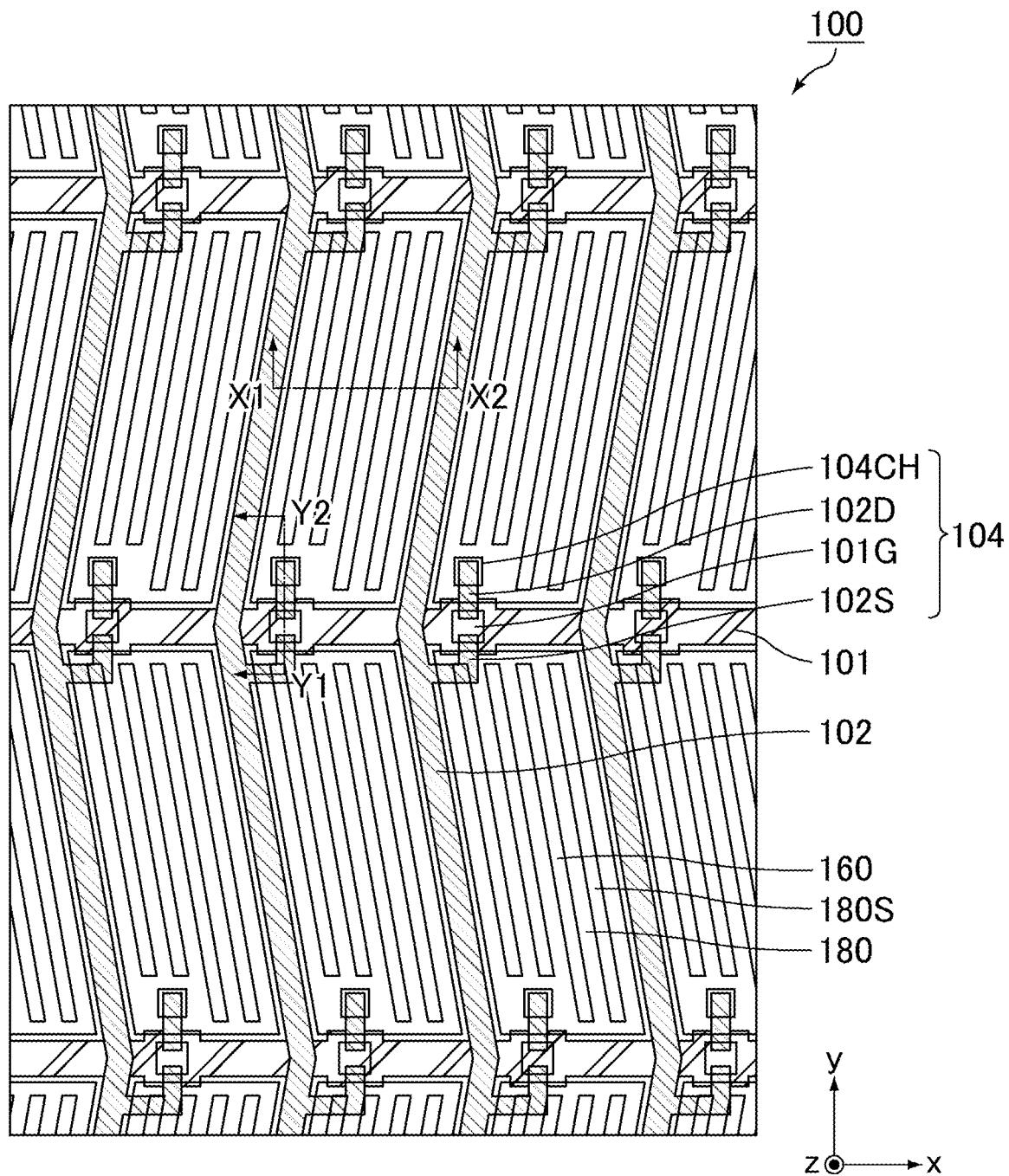
FIG. 3 is a schematic plan view showing a pixel structure of a TFT substrate in the liquid crystal display device of Embodiment 1.
Figure 4:
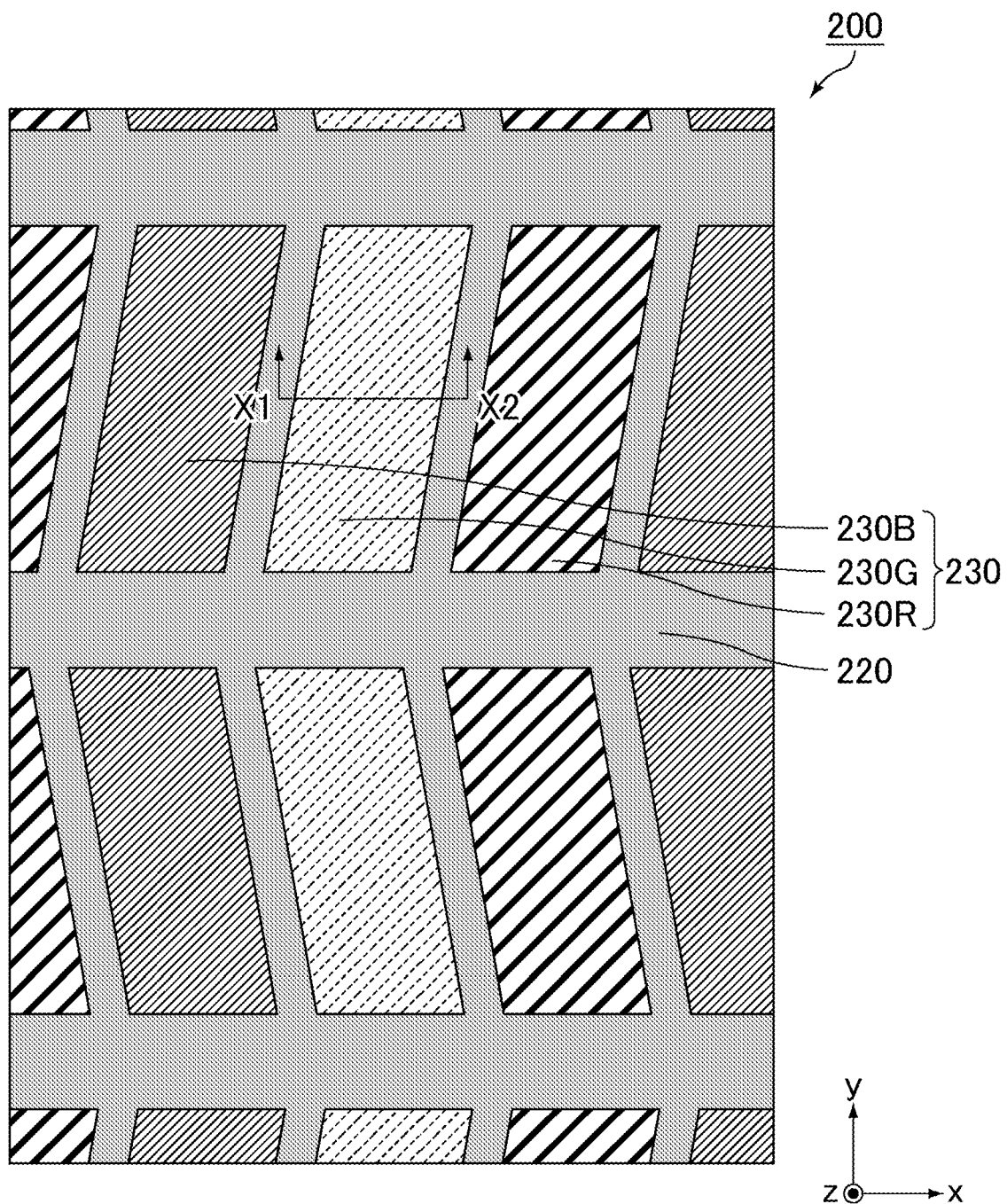
FIG. 4 is a schematic plan view showing a pixel structure of a CF substrate in the liquid crystal display device of Embodiment 1.
Figure 5:
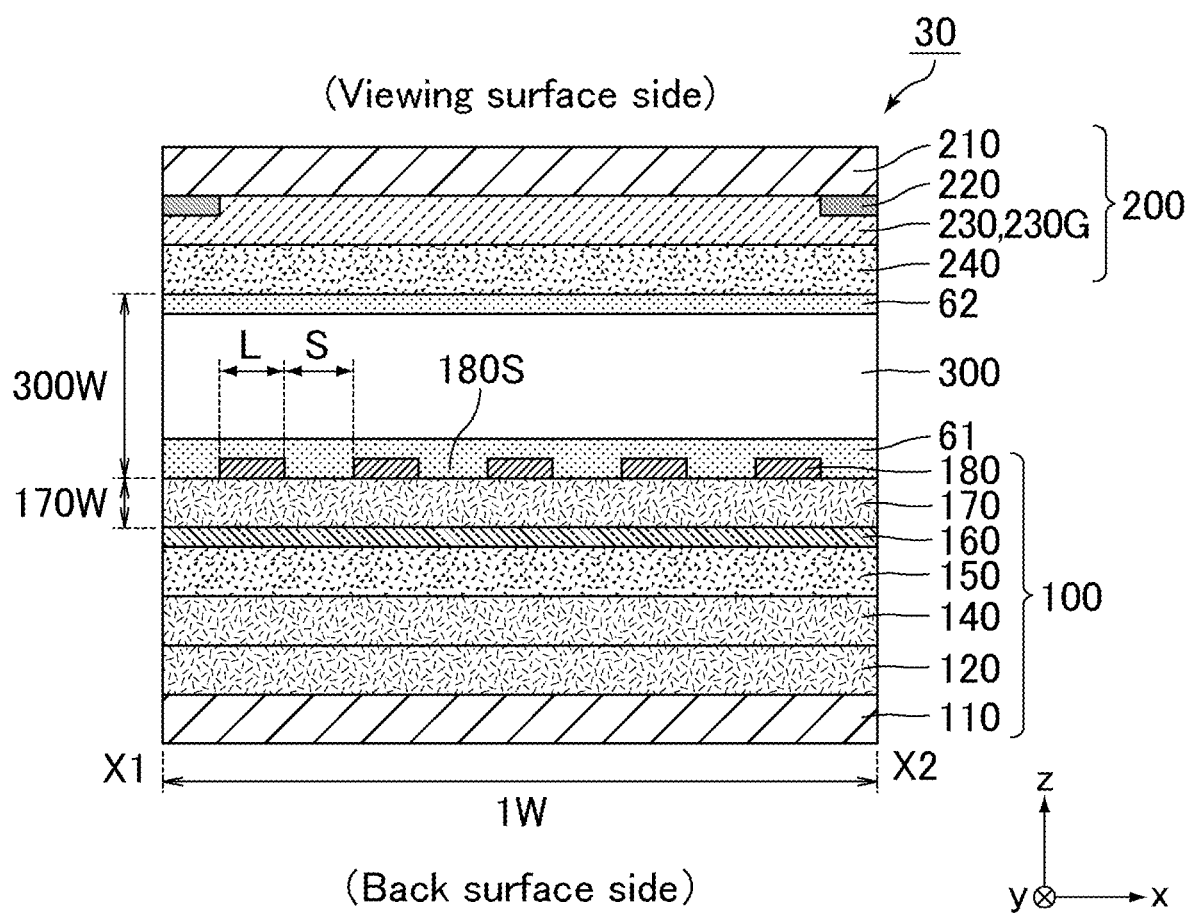
FIG. 5 is a schematic cross-sectional view of a liquid crystal panel of Embodiment 1, taken along line X1-X2 in FIG. 3 and FIG. 4.
Figure 6:
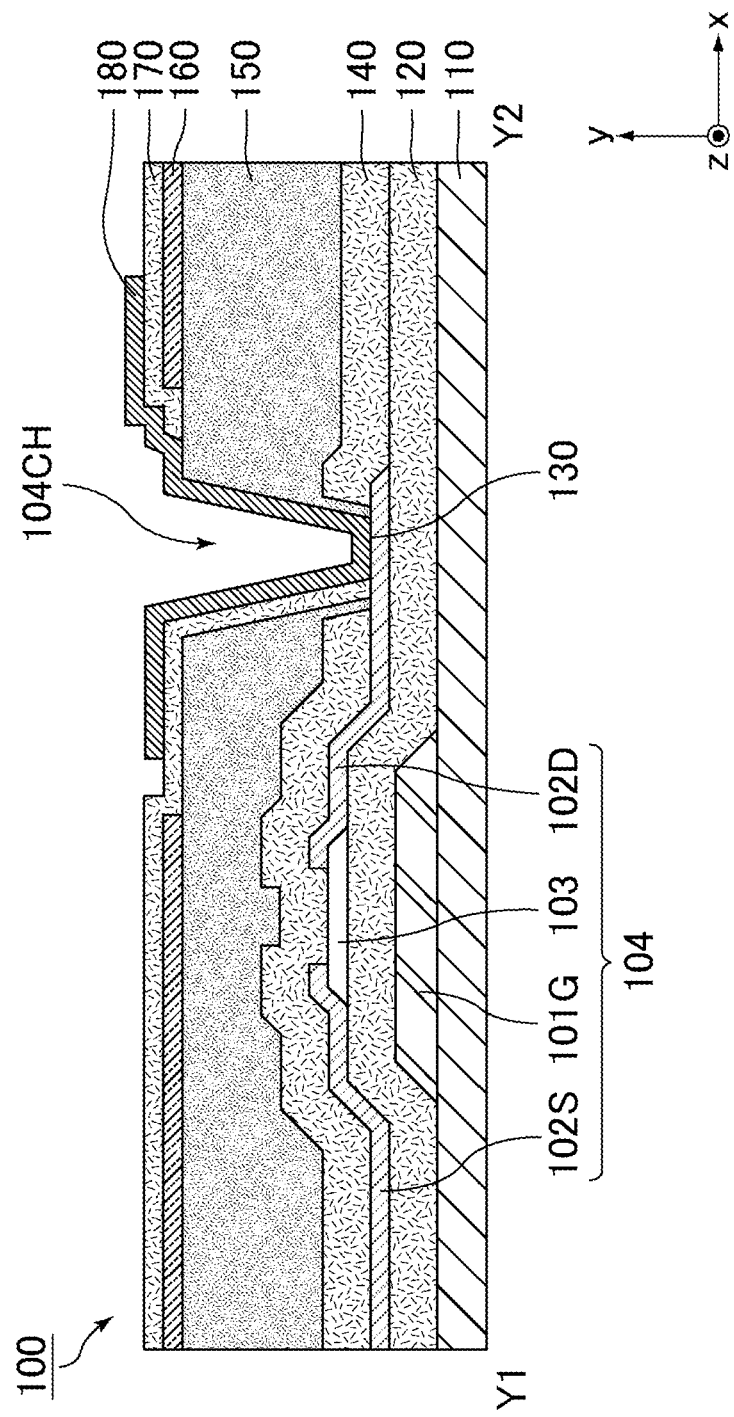
FIG. 6 is a schematic cross-sectional view of the TFT substrate, taken along line Y1-Y2 in FIG. 3.

FIG. 3 is a schematic plan view showing a pixel structure of a TFT substrate in the liquid crystal display device of Embodiment 1. FIG. 4 is a schematic plan view showing a pixel structure of a CF substrate in the liquid crystal display device according to Embodiment 1. FIG. 5 is a schematic cross-sectional view of a liquid crystal panel of the embodiment, taken along line X1-X2 in FIG. 3 and FIG. 4. FIG. 6 is a schematic cross-sectional view of the TFT substrate, taken along line Y1-Y2 in FIG. 3. FIG. 3 and FIG. 4 are schematic plan views viewed from the viewing surface side.

As shown in FIG. 1 and FIG. 5, the liquid crystal panel 30 of the present embodiment sequentially includes from the back surface side towards the viewing surface side: a thin-film transistor (TFT) substrate 100; a first alignment film 61; a liquid crystal layer 300; a second alignment film 62; and a color filter (CF) substrate 200.

As shown in FIG. 3 and FIG. 6, the TFT substrate 100 is a substrate provided with a thin-film transistor 104 that is a switching element used to turn on and off a pixel of the liquid crystal display device 1. In the present embodiment, the structure of the TFT substrate 100 for the FFS mode will be described. The TFT substrate 100 is also applicable in other transverse electric field modes such as the in-plane-switching (IPS) mode.

The TFT substrate 100 has TFTs 104, and sequentially includes from the back surface side towards the viewing surface side: a supporting substrate 110; gate lines 101; a gate insulating film 120; source lines 102; a source insulating film 140; a planarizing film 150; a common electrode 160; an interlayer insulating film 170; and pixel electrodes (signal electrodes) 180. In such a structure, application of voltage between the common electrode 160 and the pixel electrodes 180 forming paired electrodes generates a horizontal electric field (fringe electric field) in the liquid crystal layer 300. Therefore, adjusting the voltage applied between the common electrode 160 and the pixel electrodes 180 can control the alignment of liquid crystal molecules in the liquid crystal layer 300.

The TFT substrate 100 includes, on the supporting substrate 110, a plurality of gate lines 101 extending parallel to each other and a plurality of source lines 102 extending parallel to each other in a direction intersecting the gate lines 101 via the gate insulating film 120. The plurality of gate lines 101 and the plurality of source lines 102 are arranged in a grid pattern as a whole to define pixels. The TFTs 104 as switching elements are disposed at the respective intersections of the gate lines 101 and the source lines 102.

Each TFT 104 is a three-terminal switch connected to the corresponding gate line 101 and the corresponding source line 102 forming the intersection among the plurality of gate lines 101 and the plurality of source lines 102. The three-terminal switch includes a gate electrode 101G (part of the gate line 101) protruding from the gate line 101, a source electrode 102S (part of the source line 102) protruding from the source line 102, a drain electrode 102D connected to the corresponding pixel electrode 180 among the plurality of pixel electrodes 180, and a thin-film semiconductor layer 103. The source electrode 102S and the drain electrode 102D are provided in the same source line layer 130 as the source line 102. The gate electrode 101G is provided in the same gate line layer as the gate line 101. Each pixel electrode 180 is connected to the corresponding drain electrode 102D through a contact hole 104CH provided in the interlayer insulating film 170, the common electrode 160, the planarizing film 150, and the source insulating film 140.

The thin-film semiconductor layer 103 of each TFT 104 is composed of, for example, a high-resistance semiconductor layer made of amorphous silicon, polysilicon, or the like, and a low-resistance semiconductor layer made of n+ amorphous silicon, which is amorphous silicon doped with an impurity such as phosphorus. Alternatively, an oxide semiconductor layer made of zinc oxide, for example, may be used as the thin-film semiconductor layer 103.

The TFT 104 includes, for example, a channel having a known structure and including a semiconductor layer made of an oxide semiconductor material such as indium gallium zinc oxide (IGZO).

The supporting substrate 110 is preferably a transparent substrate such as a glass substrate or a plastic substrate.

The gate insulating film 120, the source insulating film 140, and the interlayer insulating film 170 are inorganic insulating films, for example. The inorganic insulating films used may be, for example, inorganic films (relative permittivity $\varepsilon=5$ to 7) such as silicon nitride (SiNx) films or silicon oxide ($SiO_2$) films, or laminated films thereof. The gate insulating film 120 and the source insulating film 140 are silicon oxide inorganic films, for example. The interlayer insulating film 170 is, for example, a silicon nitride inorganic film, and has a film thickness 170 W of 0.2 μm, for example.

The gate line layer and the source line layer 130 each include, for example, a single layer or multiple layers of a metal such as copper, titanium, aluminum, molybdenum, or tungsten, or an alloy of any of these. Various lines and electrodes constituting the gate lines 101, the source lines 102, and the TFTs 104 are formed by depositing a metal such as copper, titanium, aluminum, molybdenum, or tungsten, or an alloy of any of these, in a single layer or multiple layers by a method such as sputtering, followed by patterning by a method such as photolithography. Use of the same material for those formed in the same layer, among these various lines and electrodes, increases the production efficiency.

The planarizing film 150 planarizes the liquid crystal layer 300 side surface of the TFT 104 in the TFT substrate 100. The planarizing film 150 used may be, for example, an organic insulating film (relative permittivity $\varepsilon=3$ to 4). A specific example thereof is an acrylic resin film. The planarizing film 150 is formed by, for example, applying a photocurable resin, followed by UV irradiation and firing.

The common electrode 160 is an electrode formed on almost the entire surface regardless of the pixel boundaries, excluding specific portions such as the connecting portion (contact hole 104CH) between the pixel electrode 180 and the drain electrode 102D. A common signal maintained at a constant value is supplied to the common electrode 160, and the common electrode 160 is maintained at a constant potential.

The pixel electrode 180 is an electrode disposed in each region surrounded by two gate lines 101 adjacent to each other and two source lines 102 adjacent to each other. The pixel electrode 180 is electrically connected to the corresponding source line 102 via the thin-film semiconductor layer 103 in the TFT 104. The pixel electrode 180 is set to have a potential corresponding to the data signal supplied via the corresponding TFT 104. The width 1 W of each pixel provided with a single pixel electrode 180 is, for example, 28 μm.

As shown in FIG. 3 and FIG. 5, the pixel electrode 180 is provided with a plurality of slits 180S parallel to each other. The slits 180S are provided at an angle inclined with respect to the initial alignment azimuth of the liquid crystal molecules. Providing the slits 180S in the pixel electrode 180 at an angle inclined with respect to the initial alignment azimuth of the liquid crystal molecules allows rotation of the liquid crystal molecules in a certain direction, enabling control of the alignment of the liquid crystal molecules by voltage control. A ratio L/S between the width L of each linear portion between the slits of the pixel electrode 180 and the width S of the slit in the pixel electrode 180 is, for example, L/S=3 μm/4 μm.

Examples of the materials for the common electrode 160 and the pixel electrodes 180 include indium tin oxide (ITO) and indium zinc oxide (IZO).

The first alignment film 61 and the second alignment film 62 have a function of controlling the alignment of liquid crystal molecules in the liquid crystal layer 300. When the voltage applied to the liquid crystal layer 300 is lower than the threshold voltage (including the case of no voltage application), the alignment of liquid crystal molecules in the liquid crystal layer 300 is preferably controlled such that the major axes of the liquid crystal molecules orient in a horizontal direction with respect to the first alignment film 61 and the second alignment film 62 mainly by the action of the first alignment film 61 and the second alignment film 62.

The expression that the major axes of the liquid crystal molecules orient in a horizontal direction with respect to the first alignment film 61 and the second alignment film 62 means that the tilt angles (including the pre-tilt angles) of the liquid crystal molecules are 0° to 5°, preferably 0° to 3°, more preferably 0° to 1° with respect to the first alignment film 61 and the second alignment film 62. The tilt angles of the liquid crystal molecules refer to the angles at which the major axes (optical axes) of the liquid crystal molecules are tilted with respect to the surfaces of the first polarizer 11 and the second polarizer 12.

The first alignment film 61 and the second alignment film 62 are layers having undergone an alignment treatment for controlling the alignment of liquid crystal molecules. Alignment films commonly used in the field of liquid crystal display devices such as polyimide films can be used. Examples of the materials for the first alignment film 61 and the second alignment film 62 include polymers having a main chain such as polyimide, polyamic acid, and polysiloxane. A photoalignment film material having a photoreactive site (functional group) in the main chain or a side chain are suitably used.

The liquid crystal layer 300 controls the transmission amount of light by changing the alignment of the liquid crystal molecules according to the electric field generated in the liquid crystal layer 300 by voltage application between the common electrode 160 and the pixel electrodes 180 forming paired electrodes. The liquid crystal molecules in the liquid crystal layer 300 are preferably aligned horizontally by the regulating force of the first alignment film 61 and the second alignment film 62 when no voltage is applied between the paired electrodes provided in the TFT substrate 100 (state with no voltage applied). In other words, the liquid crystal molecules in the liquid crystal layer 300 are preferably controlled such that their major axes orient in a horizontal direction with respect to the first alignment film 61 and the second alignment film 62. The liquid crystal molecules in the liquid crystal layer 300 rotate in the in-plane direction according to the horizontal electric field generated in the liquid crystal layer 300 when voltage is applied between the paired electrodes (state with voltage applied). A cell gap 300 W, which is the thickness of the liquid crystal layer 300, is 3 µm, for example.

The liquid crystal molecules may have a positive or negative anisotropy of dielectric constant ($\Delta\varepsilon$) defined by the following formula (L). The liquid crystal layer 300 of the present embodiment preferably contains liquid crystal molecules having a negative $\Delta\varepsilon$. Liquid crystal molecules having a positive anisotropy of dielectric constant are also called positive liquid crystals, and liquid crystal molecules having a negative anisotropy of dielectric constant are also called negative liquid crystals. The major axis direction of the liquid crystal molecules is the direction of the slow axis.

$$\Delta\varepsilon=\text{(dielectric constant in major axis direction)}-\text{(dielectric constant in minor axis direction)} \quad (L)$$

The slow axis of the liquid crystal layer 300 is preferably set parallel to the transmission axis of the polarizer disposed close to the viewing angle compensating retardation film 20 side. Thereby, the azimuth of the transmission axis of the first polarizer 11, the azimuth of the transmission axis of the second polarizer 12, and the azimuth of the slow axis of the liquid crystal layer 300 are determined. In the present embodiment, since the viewing angle compensating retardation film 20 is adjacent to the first polarizer 11, the slow axis of the liquid crystal layer 300 is preferably set parallel to the transmission axis of the first polarizer 11. The slow axis of the back surface side biaxial retarder 40 is preferably set parallel to the transmission axis of the second polarizer 12.

In the present embodiment, the viewing angle compensating retardation film 20 is provided adjacent to the first polarizer 11. Alternatively, the viewing angle compensating retardation film 20 may be provided adjacent to the second polarizer 12. In this case, the slow axis of the liquid crystal layer 300 is preferably set parallel to the transmission axis of the second polarizer 12.

As shown in FIG. 4 and FIG. 5, the CF substrate 200 sequentially includes from the viewing surface side towards the back surface side: a supporting substrate 210; a black matrix layer 220; a CF layer 230; and a planarizing film 240.

The supporting substrate 210 is preferably a transparent substrate such as a glass substrate and a plastic substrate.

The black matrix layer 220 is provided on the support substrate 210 in a grid pattern corresponding to the gate lines 101 and the source lines 102, and is arranged outside the pixel regions. The black matrix layer 220 may be formed of any material that has a light blocking property. Suitably used is a resin material containing a black pigment or a light-blocking metal material. The black matrix layer 220 is formed, for example, by photolithography in which a photosensitive resin containing a black pigment is applied to form a film, followed by processing of the film such as exposure and development.

The CF layer 230 has a structure including a red color filter 230R, a green color filter 230G, and a blue color filter 230B arranged in the same plane, defined by the black matrix layer 220. The red color filter 230R, the green color filter 230G, and the blue color filter 230B are made of, for example, a pigment-containing transparent resin. Normally, a combination of the red color filter 230R, the green color filter 230G, and the blue color filter 230B is provided in every pixel. A desired color is obtained in each pixel by mixing colored lights passing through the red color filter 230R, the green color filter 230G, and the blue color filter 230B in controlled amounts.

The planarizing film 240 covers the liquid crystal layer 300 side surface of the CF layer 230. The planarizing film 240 has a function of planarizing the ground for the second alignment film 62 when the surface on the liquid crystal layer 300 side of the CF layer 230 is not flat. The planarizing film 240 can prevent dissolution of impurities in the CF layer 230 into the liquid crystal layer 300. For example, an organic insulating film (relative permittivity $\varepsilon$=3 to 4), specifically an acrylic resin film, can be used as the planarizing film 240. The planarizing film 240 is formed by, for example, applying a photocurable resin, followed by ultraviolet irradiation and firing.

The liquid crystal panel 30 may be of any liquid crystal mode, such as a mode providing black display by aligning liquid crystal molecules in a liquid crystal layer in a direction perpendicular to the substrate surfaces or a mode providing black display by aligning liquid crystal molecules in a liquid crystal layer in a direction parallel to the substrate surfaces or in a direction that is not parallel or perpendicular to the substrate surfaces. Examples of the driving mode of the liquid crystal panel include TFT mode (active matrix mode), simple matrix mode (passive matrix mode), and plasma address mode. Examples of the structure of the liquid crystal panel include a structure in which a liquid crystal layer is sandwiched between a pair of substrates one of which includes pixel electrodes and a common electrode, and an image is displayed by applying voltage between the pixel electrodes and the common electrode to form a horizontal electric field (including a fringe electric field) in the liquid crystal layer; a structure in which a liquid crystal layer is sandwiched between a pair of substrates one of which includes pixel electrodes and the other of which includes a common electrode, and an image is displayed by applying voltage between the pixel electrodes and the common electrode to form a vertical electric field in the liquid crystal layer. More specific examples of the horizontal electric field mode include an FFS mode and an IPS mode, in both of which liquid crystal molecules in a liquid crystal layer are aligned in a direction parallel to the substrate surfaces in a state with no voltage applied. More specific examples of the vertical electric field mode include a vertical alignment (VA) mode in which liquid crystal molecules in a liquid crystal layer are aligned in a direction perpendicular to the substrate surfaces in a state with no voltage applied.

The backlight 50 shown in FIG. 1 includes a light source 51 and a prism sheet 52 disposed closer to the viewing surface side than the light source 51 is. The backlight 50 may be any backlight that can irradiate the liquid crystal panel 30 with light such as a direct-lit type or an edge-lit type.

The light source 51 may be any light source that emits light including visible light, and may be one that emits light consisting only of visible light or one that emits light including both visible light and ultraviolet light. A light source that emits white light is suitably used to allow the liquid crystal display device 1 to perform color display. As for the type of the light source, suitably used is a cold cathode fluorescent lamp (CCFL) or a light emitting diode (LED), for example. The "visible light" herein means light (electromagnetic waves) with a wavelength of not shorter than 380 nm and shorter than 800 nm.

Figure 7:
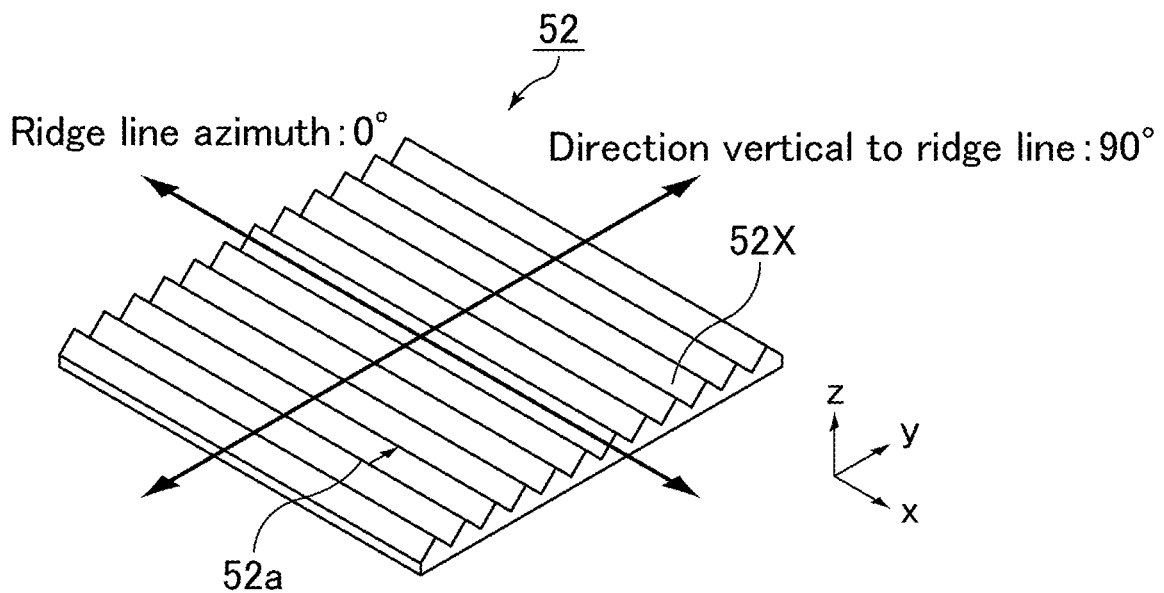
FIG. 7 is a schematic perspective view of a prism sheet in the liquid crystal display device of the present embodiment.

FIG. 7 is a schematic perspective view of a prism sheet in the liquid crystal display device of the present embodiment. The prism sheet 52 includes prisms 52X arranged in multiple columns on the surface close to the viewing surface side. In other words, the prism sheet 52 has prisms 52X in multiple columns extending parallel to each other on the surface close to the viewing surface side. Ridge lines 52a of the prisms 52X are all straight lines formed by linearly continuing top apexes of the prisms 52X.

The ridge lines 52a of the prisms 52X preferably have an azimuthal angle of 0°±3°. Since the prism sheet has a function of focusing oblique light beams in the front direction, the light distribution at an azimuth perpendicular to the ridge lines is narrowed. Therefore, the ridge lines 52a of the prisms 52X having an azimuthal angle of 0°±3° enables the prism sheet 52 to focus less light at the horizontal azimuth (90°-270° azimuthal angle direction) than that at the vertical azimuth (90°-270° azimuthal angle direction) to increase oblique luminance at the horizontal azimuth, thereby achieving a wide viewing angle. Such an embodiment is particularly suitable for OEM standards that require a wide luminance viewing angle at the horizontal azimuth.

Figure 8:
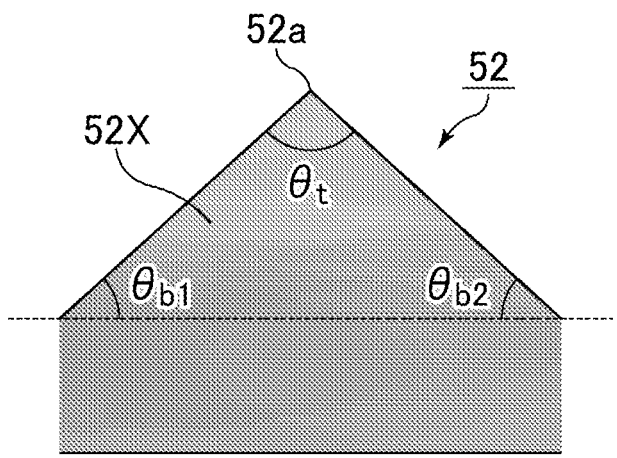
FIG. 8 is a schematic cross-sectional view for illustrating a cross sectional shape of a prism of the prism sheet.

Next, descriptions are given on the principles of focusing of light by the prism sheet 52 and generation of side lobes and preferred shapes of the prism sheet 52 in the embodiments. FIG. 8 is a schematic cross-sectional view for illustrating a cross-sectional shape of a prism of the prism sheet. In the cross-sectional shape of a prism 52X in the direction perpendicular to the ridge line 52a, the apex angle is $\theta_t$, the base angles are $\theta_{b1}$ and $\theta_{b2}$. The refractive index of the prism sheet base material is defined as $n_{prism}$, and the refractive index of the air layer is defined as $n_{air}$.

Figure 9:
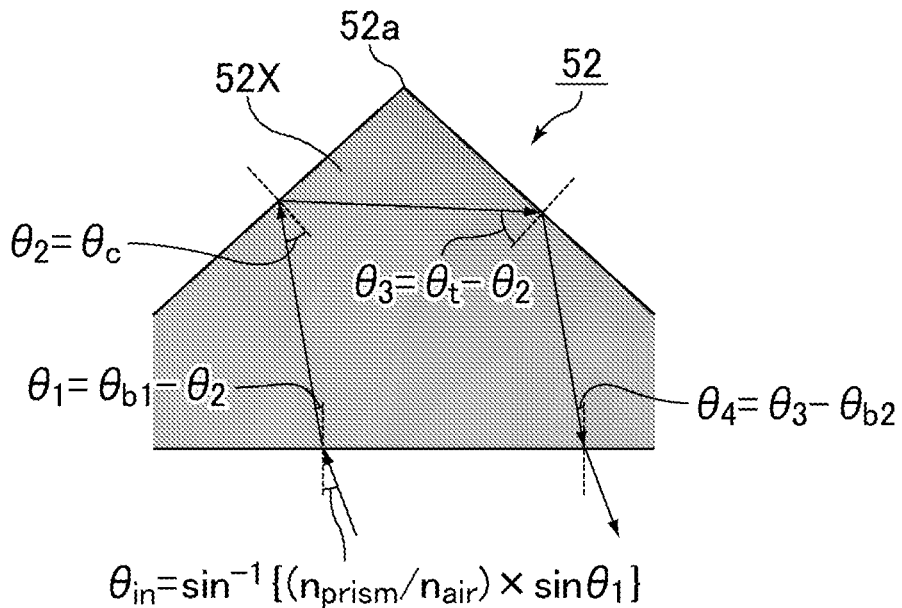
FIG. 9 is an example of a schematic cross-sectional view illustrating a case where a light beam is not emitted from the prism sheet and returns in a backlight direction.
Figure 10:
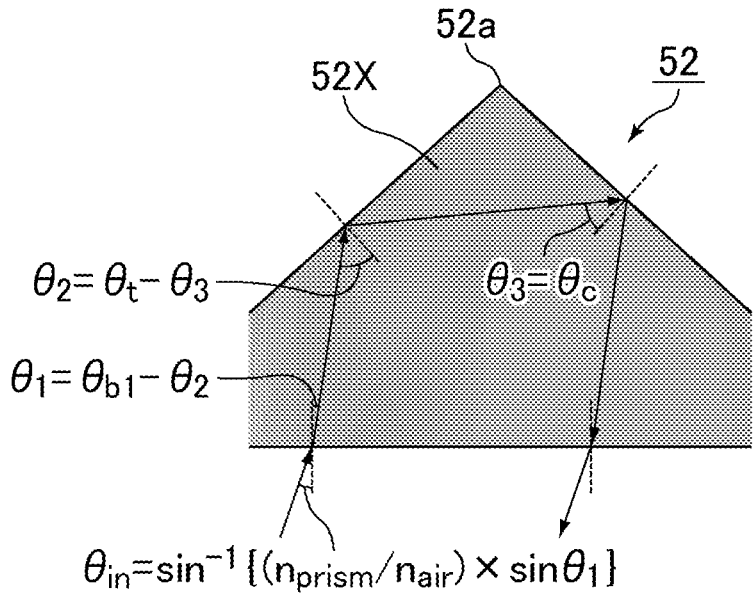
FIG. 10 is another example of a schematic cross-sectional view illustrating the case where a light beam is not emitted from the prism sheet and returns in the backlight direction.

(1) Case where a Light Beam is not Emitted from the Prism Sheet and Returns in the Direction Towards the Backlight FIG. 9 and FIG. 10 are examples of a schematic cross-sectional view illustrating a case where a light beam is not emitted from the prism sheet and returns in the direction towards the backlight. The angle of incidence on the prism sheet 52 is defined as $\theta_{in}$, and the angles of refraction, incidence, and reflection are defined as shown in FIG. 9. When $\theta_2$ in FIG. 9 is equal to or greater than the critical angle $\theta_c$ that is determined based on the refractive index of the prism sheet 52 and the refractive index of the air layer, the light beam is totally reflected at the interface between the prism sheet 52 and the air layer. The totally reflected light beam is incident on the interface between the prism sheet 52 and the air layer on the opposite side at an angle of incidence $\theta_3$, and $\theta_3$ is geometrically expressed as $\theta_3=\theta_t-\theta_2$. When $\theta_3>\theta_c$ is satisfied, the light beam is again totally reflected at the interface between the prism sheet 52 and the air layer on the opposite side to return to the back surface side (light source 51 side). In the case shown in FIG. 10 as well, the light incident on the prism sheet 52 returns to the back surface side due to total reflection as in FIG. 9.

Figure 11:
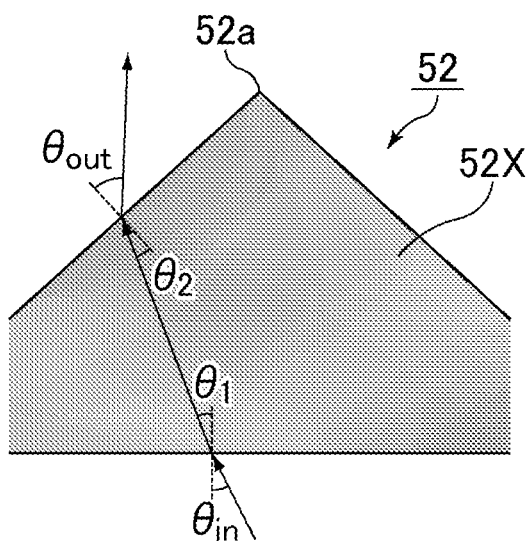
FIG. 11 is an example of a schematic cross-sectional view illustrating a case where a light beam focuses in the front direction through the prism sheet.

(2) Case where a Light Beam Emitted from the Prism Sheet is Focused in the Front Direction FIG. 11 is an example of a schematic cross-sectional view illustrating a case where a light beam emitted from the prism sheet is focused in the front direction. As shown in FIG. 11, when $\theta_2<\theta_c$ is satisfied, the light beam is focused in the front direction.

(3) Case where a Light Beam is Emitted from the Prism Sheet as a Side Lobe

Figure 12:
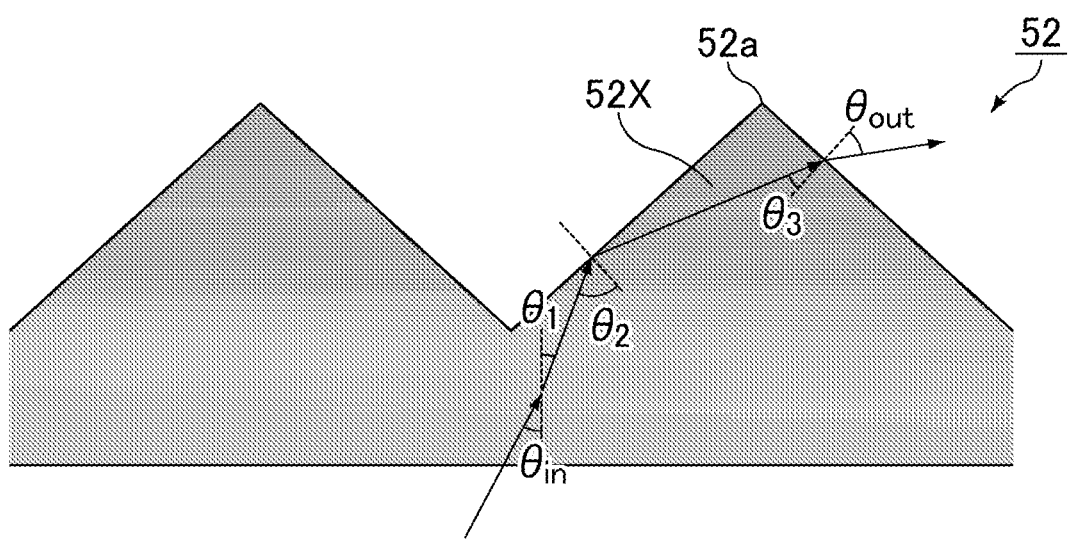
FIG. 12 is an example of a schematic cross-sectional view illustrating a case where a light beam is emitted as a side lobe from the prism sheet.

FIG. 12 is an example of a schematic cross-sectional view illustrating a case where a light beam is emitted from the prism sheet as a side lobe. As shown in FIG. 12, when $\theta_2>\theta_c$ and $\theta_3<\theta_c$ are both satisfied, the light beam is emitted as a side lobe.

Figure 13:
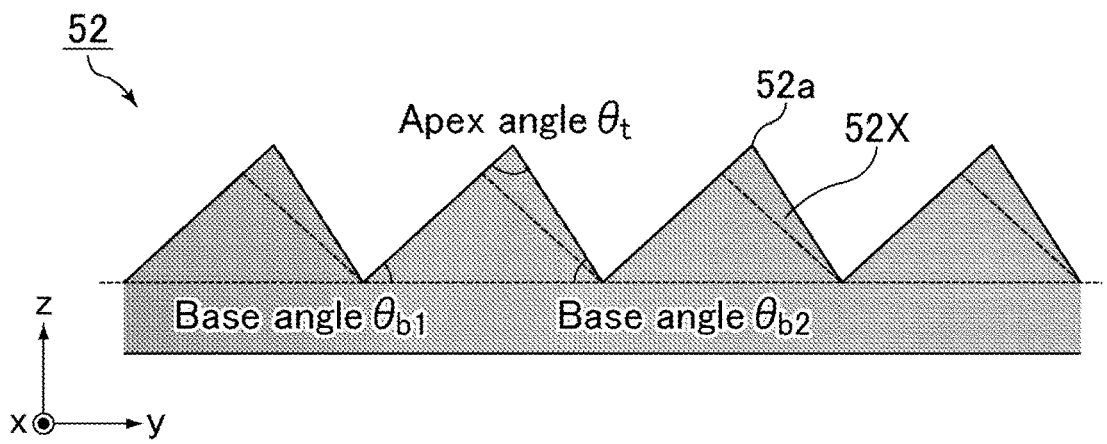
FIG. 13 is a schematic cross-sectional view of the prism sheet in the liquid crystal display device of Embodiment 1.

FIG. 13 is a schematic cross-sectional view of the prism sheet in the liquid crystal display device of Embodiment 1. As shown in FIG. 13, the prism 52X has a triangular cross-sectional shape in the direction perpendicular to the ridge lines 52a, with an apex angle $\theta_t$ on the viewing surface side and a pair of base angles $\theta_{b1}$ and $\theta_{b2}$ on the back surface side. The apex angle $\theta_t$ is not smaller than 80° but smaller than 90°. Such an embodiment enables sufficient satisfaction of the side lobe conditions, effectively reducing or preventing a decrease in oblique CR. The side lobe conditions herein means that a light diffusion property curve has no side lobe or has a side lobe satisfying a ratio of a local maximum luminance to a local minimum luminance of 1.35 or less, where the light diffusion property curve is obtained by plotting a luminance in a white display state in a direction perpendicular to ridge lines of the prisms against a polar angle.

The prism 52X has a pair of base angles $\theta_{b1}$ and $\theta_{b2}$ different from each other. Such an embodiment enables sufficient satisfaction of the side lobe conditions, effectively reducing or preventing a decrease in oblique CR. A typical prism has an isosceles right triangular cross-sectional shape. In the present embodiment, however, the prism 52X has a cross sectional shape deformed from an isosceles right triangle.

The difference between the pair of base angles $\theta_{b1}$ and $\theta_{b2}$ of each prism 52X is preferably 5° or greater but not greater than 15°, more preferably 7° or greater but not greater than 13°. Such an embodiment enables sufficient satisfaction of the side lobe conditions, effectively reducing or preventing a decrease in oblique CR.

The liquid crystal display device 1 of the present embodiment includes, in addition to the above members, multiple members including: external circuits such as a tape carrier package (TCP) and a printed circuit board (PCB); optical films such as a viewing angle widening film and a luminance enhancing film; and other components such as a bezel (frame). A member may be incorporated into another member in some cases. Members other than the members described above may be any members commonly used in the field of liquid crystal display devices, and therefore, descriptions thereof are omitted.

Embodiment 2

In the present embodiment, the features unique to the present embodiment will be mainly described, and the repetitive description for the content overlapping with that of the first embodiment will be omitted. The present embodiment is substantially the same as Embodiment 1 except that the structure of the backlight 50 is different.

Figure 14:
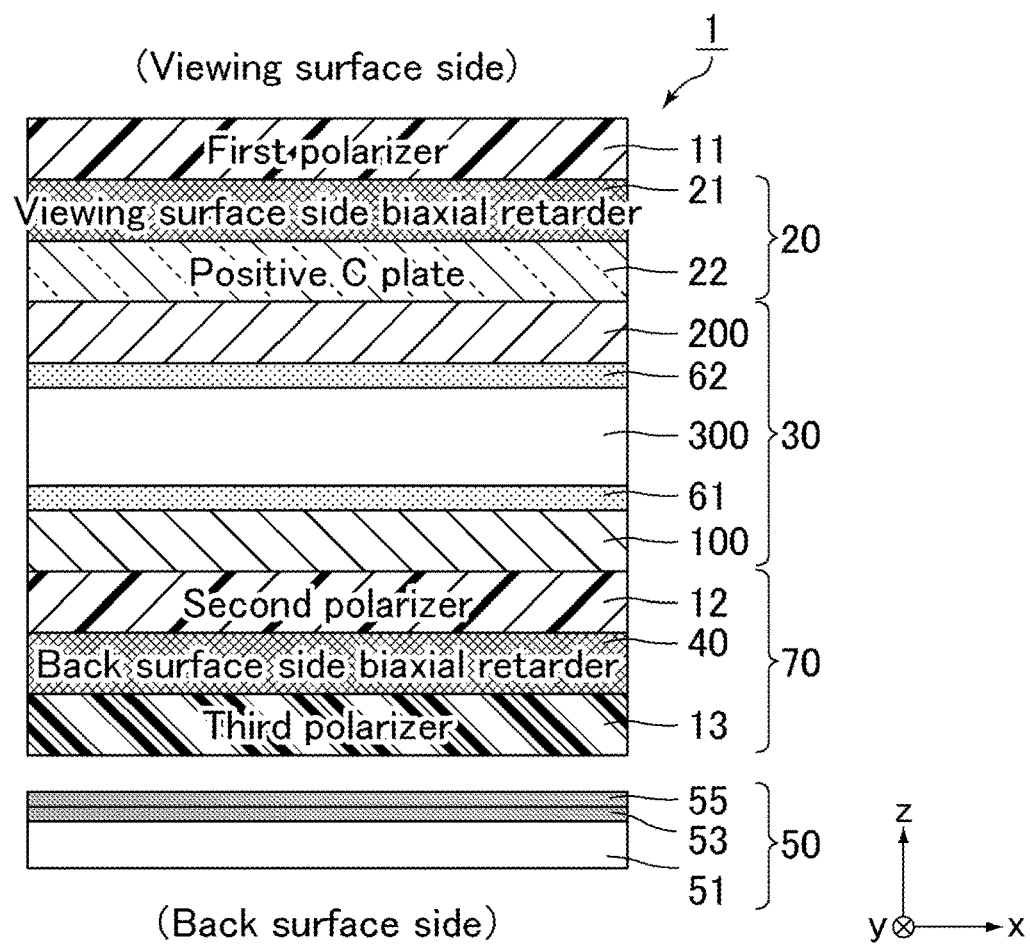
FIG. 14 is a schematic cross-sectional view of a liquid crystal display device of Embodiment 2.
Figure 15:
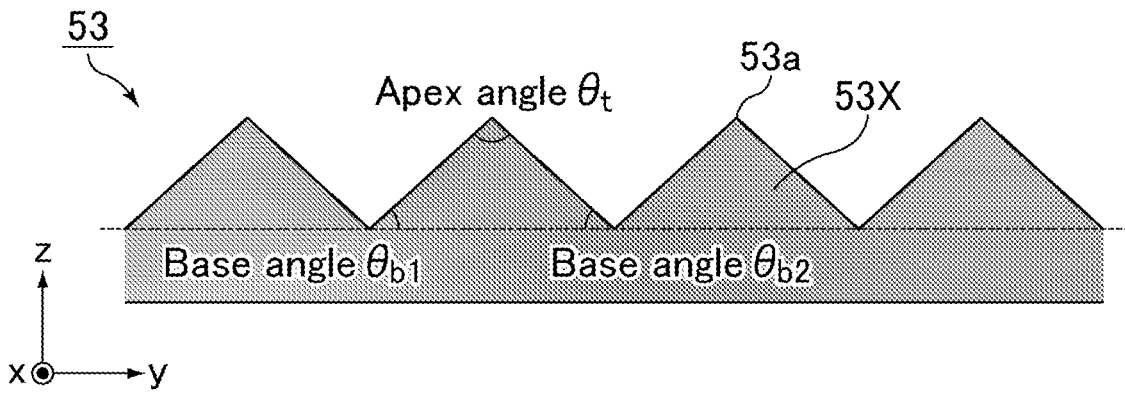
FIG. 15 is a schematic cross-sectional view of a prism sheet in the liquid crystal display device of Embodiment 2.

FIG. 14 is a schematic cross-sectional view of a liquid crystal display device of Embodiment 2. FIG. 15 is a schematic cross-sectional view of a prism sheet in the liquid crystal display device of Embodiment 2. As shown in FIG. 14 and FIG. 15, the backlight 50 in the liquid crystal display device 1 of the present embodiment sequentially includes from the back surface side towards the viewing surface side: the light source 51, the prism sheet 53, and the diffuser sheet 55. Such an embodiment also reduces or prevents a decrease in front CR as well as a decrease in oblique CR.

The prism sheet 53 includes prisms 53X arranged in multiple columns on the surface close to the viewing surface side. In other words, the prism sheet 53 includes prisms 53X in multiple columns extending parallel to each other on the surface close to the viewing surface side. Ridgelines 53$a$ of the prisms 53X are all straight lines formed by linearly continuing top apexes of the prism 53X.

The ridge lines 53$a$ of the prisms 53X preferably have an azimuthal angle of 0°±3°. Since the prism sheet has a function of focusing oblique light beams in the front direction, the light distribution at an azimuth perpendicular to the ridge lines is narrowed. Therefore, the ridge lines 53$a$ of the prisms 53X having an 90°-270° azimuthal angle direction enables the prism sheet 53 to focus less light at the horizontal azimuth (direction of the azimuthal angle from 0° to 180°) than that at the vertical azimuth (90°-270° azimuthal angle direction) to increase oblique luminance at the horizontal azimuth, thereby achieving a wide viewing angle. Such an embodiment is particularly suitable for OEM standards that require a wide luminance viewing angle at the horizontal azimuth.

The prism 53X has an apex angle $\theta_t$ of 90° and a pair of base angles $\theta_{b1}$ and $\theta_{b2}$ both of which are 45°. In other words, the prisms 53X of the present embodiment have an isosceles right triangular cross-sectional shape, and have the same structure as general prisms.

The diffuser sheet 55 has a function of diffusing light. The diffuser sheet 55 preferably has a haze of 12% or higher but not higher than 82%. Such an embodiment enables sufficient satisfaction of the side lobe conditions, effectively reducing or preventing a decrease in oblique CR. The diffuser sheet 55 more preferably has a haze of 20% or higher but not higher than 70%, still more preferably 25% or higher but not higher than 60%.

The haze herein is a value defined by Td/(Tp+Td) wherein Tp represents the transmittance of a component that travels straight after passing through the diffuser sheet when completely parallel light is incident on the diffuser sheet and Td represents the transmittance of diffused components other than the component that travels straight after passing through the diffuser sheet (which is determined by integrating light components other than the component that travels straight with an integrating sphere).

The present invention will be described in more detail with reference to examples and comparative examples below, but the present invention is not limited only to these examples.

Comparative Example 1

Figure 16:
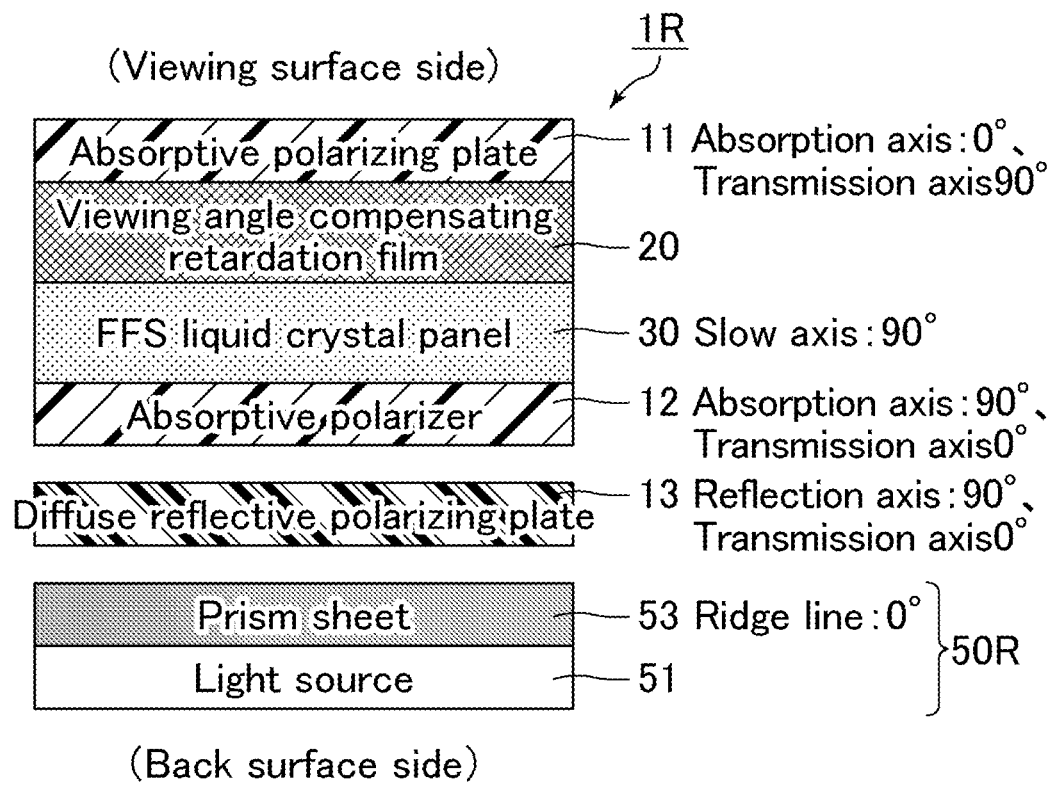
FIG. 16 is a schematic cross-sectional view of a liquid crystal display device of Comparative Example 1.
Figure 16:
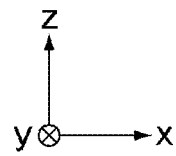
Figure 17:
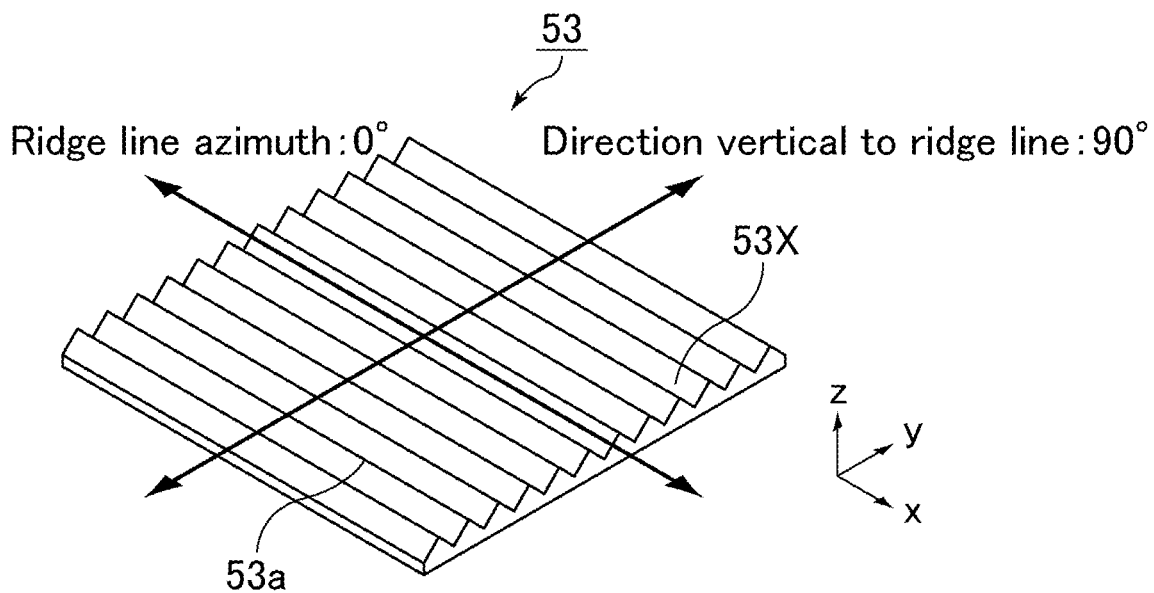
FIG. 17 is a schematic perspective view of a prism sheet in the liquid crystal display device of Comparative Example 1.
Figure 18:
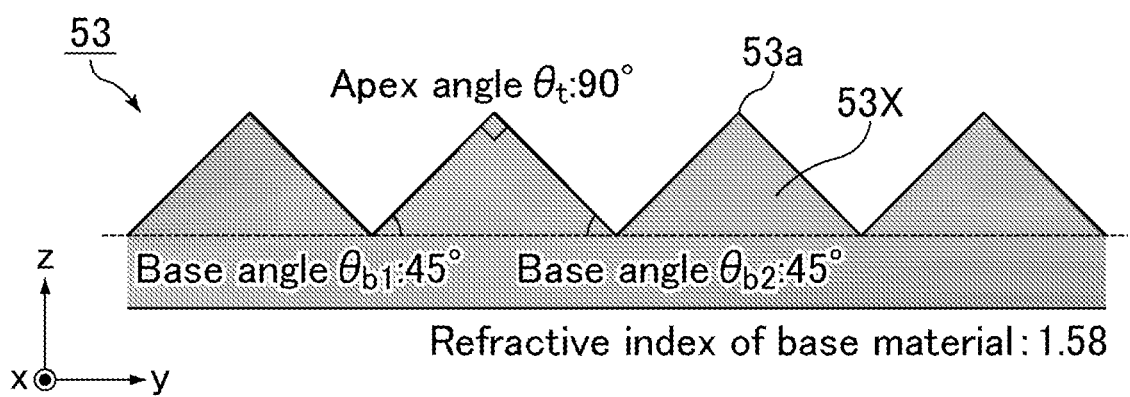
FIG. 18 is a schematic cross-sectional view of the prism sheet in the liquid crystal display device of Comparative Example 1.

FIG. 16 is a schematic cross-sectional view of a liquid crystal display device of Comparative Example 1. The angles shown in FIG. 16 represent azimuthal angles. FIG. 17 is a schematic perspective view of a prism sheet in the liquid crystal display device of Comparative Example 1. FIG. 18 is a schematic cross-sectional view of the prism sheet in the liquid crystal display device of Comparative Example 1.

A liquid crystal display device 1R of Comparative Example 1 shown in FIG. 16 was produced as a normal FFS mode liquid crystal display device. The structure of the liquid crystal panel 30 was the same as that illustrated in FIG. 3 to FIG. 6. The liquid crystal driving mode was the FFS mode. The TFTs 104 included a thin-film semiconductor layer 103 made of IGZO. The gate insulating film 120 and the source insulating film 140 were SiO$_2$ inorganic insulating films. The planarizing films 150 and 240 were made of acrylic resin. The interlayer insulating film 170 was a SiNx inorganic insulating film with a film thickness 170 W of 0.2 μm. The common electrode 160 and the pixel electrodes 180 were made of IGZO films. The liquid crystal layer 300 contained a positive liquid crystal with Δε=+2.5 and had a Δn of 0.11. The cell gap 300 W of the liquid crystal layer 300 was 3 μm. The ratio L/S between the width L of each linear portion between the slits of the pixel electrode 180 and the width S of the slit in the pixel electrode 180 was 3 μm/4 μm. The width 1 W of each pixel provided with a single pixel electrode 180 was 28 μm.

In Comparative Example 1, the azimuthal angle of the first transmission axis of the first polarizer 11 and the azimuthal angle of the slow axis of the liquid crystal layer 300 were 90°. The azimuthal angle of the second transmission axis of the second polarizer 12 and the azimuthal angle of the third transmission axis of the third polarizer 13 were 0°. Absorptive polarizing plates were used for the first polarizer 11 and the second polarizer 12, and a diffuse reflective polarizing plate was used for the third polarizer 13. The diffuse reflective polarizing plate is a polarizing plate having a diffuser on the back surface side of a reflective polarizer.

In Comparative Example 1, a backlight 50R including the light source 51 and a prism sheet 53 disposed closer to the viewing surface side than the light source 51 was and having a structure shown in FIG. 17 and FIG. 18 was used. The prism sheet 53 was a normal prism sheet used commonly.

[Measurement of Front Luminance and Front CR]

As for the liquid crystal display device of Comparative Example 1, a front luminance in a white display state and a front luminance in a black display state were measured using a luminance meter SR-UL1 available from Topcon Corporation. The front CR was calculated by dividing the front luminance in a white display state (front white luminance) by the front luminance in a black display state (front black luminance) (front CR=front white luminance/front black luminance).

[Measurement of Oblique Luminance and Oblique CR]

As for the liquid crystal display device 1R of Comparative Example 1, an oblique luminance (azimuthal angle: 0° to 360°/polar angle: 0° to 88°) in a white display state and an oblique luminance in a black display state were measured using EZ-Contrast available from ELDIM. An azimuthal angle of 0° is defined as the positive x-axis direction in the drawings, and a polar angle of 0° is defined as the positive z-axis direction in the drawings. As with the calculation of the front CR, the oblique CR was calculated by dividing the oblique luminance in a white display state (oblique white luminance) by the oblique luminance in a black display state (oblique black luminance) (oblique CR=oblique white luminance/oblique black luminance).

Figure 19:
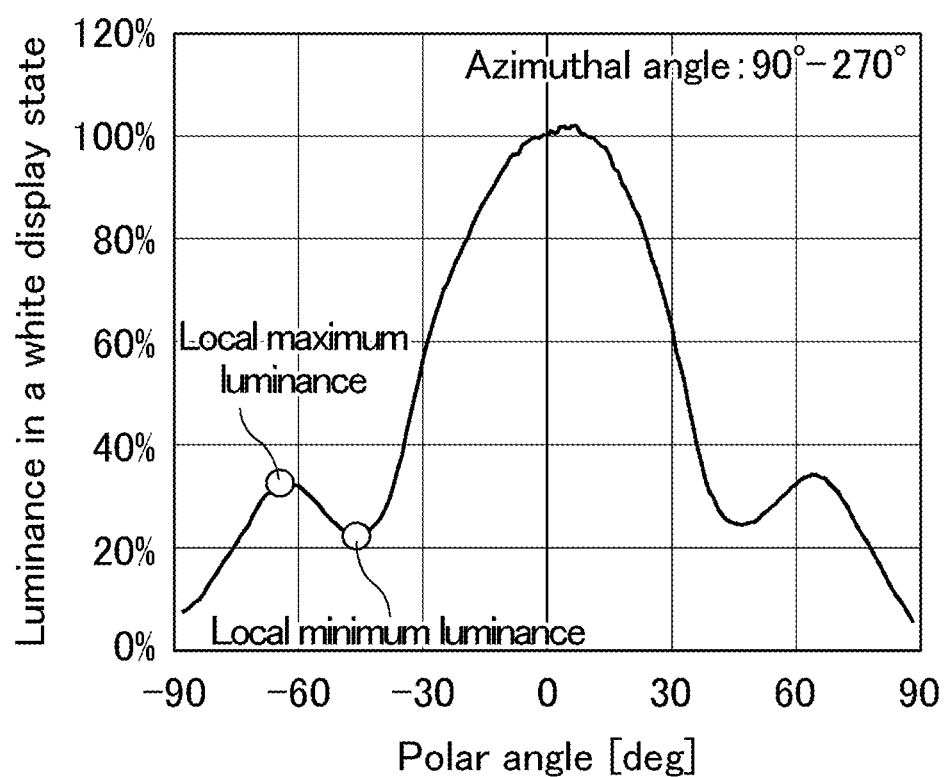
FIG. 19 is a chart showing a polar angle dependence of white luminance in a 90°-270° azimuthal angle direction of the prism sheet in the liquid crystal display device of Comparative Example 1.

In the case of a prism sheet in which ridge lines have an azimuthal angle of 0°, side lobes appear in the 90°-270° azimuthal angle direction (vertical azimuth). For evaluation of the levels of the side lobes derived from the prism sheet, the local maximum value and the local minimum value of a side lobe were defined as in FIG. 19 in the graph showing the polar angle dependence of white luminance in the 90°-270° azimuthal angle direction. The local maximum value and the local minimum value were read, and the value obtained by dividing the local maximum value by the local minimum value was calculated as an index. FIG. 19 is a chart showing a polar angle dependence of white luminance in the 90°-270° azimuthal angle direction of the prism sheet in the liquid crystal display device of Comparative Example 1. FIG. 19 shows the white luminance in the 90°-270° azimuthal angle direction, normalized with the front luminance set to 100%.

Figure 20:
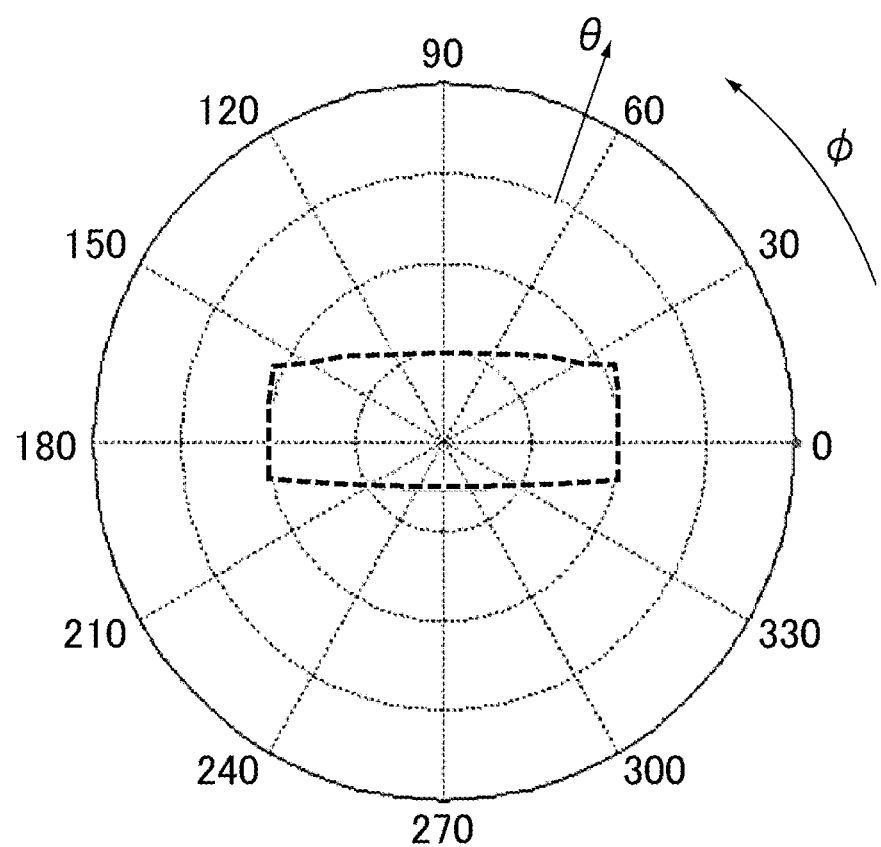
FIG. 20 is a chart illustrating area A specified in OEM standards in Europe.
Figure 21:
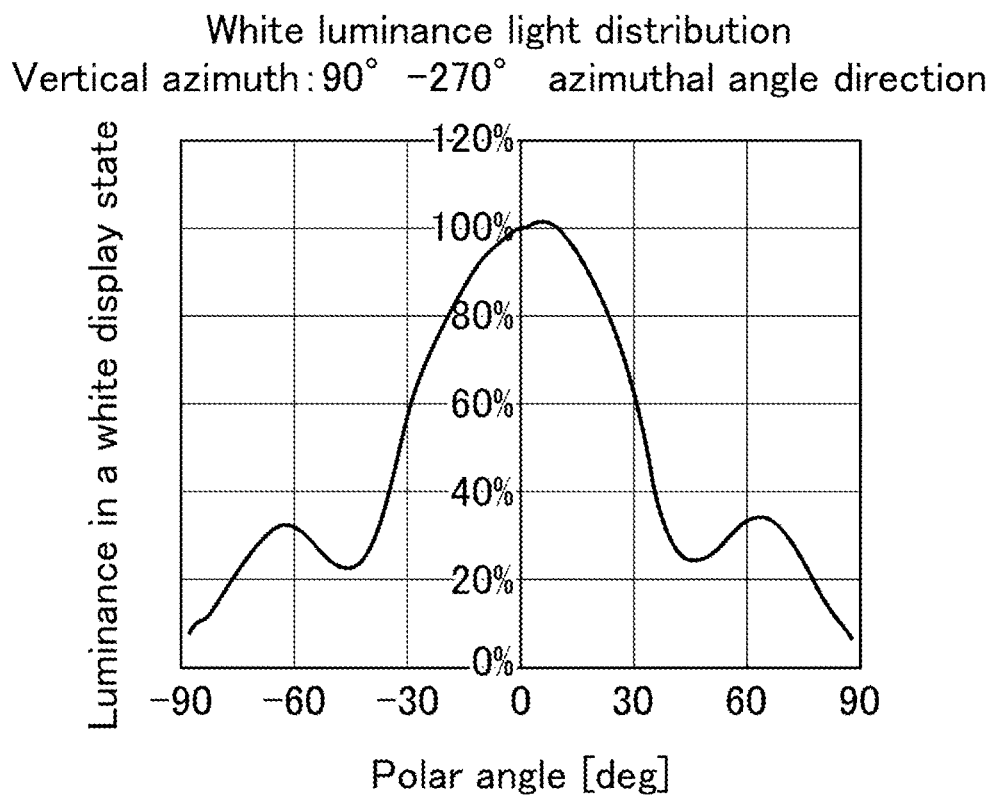
FIG. 21 is a chart showing a relation between the luminance in a white display state and the polar angle at the vertical azimuth of the liquid crystal display device of Comparative Example 1.

Area A specified in OEM standards in Europe is a range defined by dashed lines in FIG. 20 (azimuthal angle 0°:polar angle +40°, azimuthal angle 180°:polar angle −40°, azimuthal angle 90°:polar angle +20°, azimuthal angle 270°: polar angle −10°). The minimum luminance in the area A must be 450 cd/m² or more, and the minimum CR must be 650:1 (white luminance: black luminance) or more. The minimum luminance and the minimum CR in the area A were read from the evaluation result of the oblique luminance to determine whether or not the standards were satisfied. The results are shown in Table 1 below and FIG. 21. FIG. 20 is a chart illustrating area A specified in OEM standards in Europe. FIG. 21 is a chart showing a relation between the luminance in a white display state and the polar angle at the vertical azimuth of the liquid crystal display device of Comparative Example 1.

layer (back surface side biaxial retarder 40) produced by stretching a cycloolefin polymer (COP) was provided between the absorptive polarizing plate (second polarizer 12) on the back surface of the liquid crystal panel and the diffuse reflective polarizing plate (third polarizer 13) in Comparative Example 1. The liquid crystal display device 1R of Comparative Example 2 was a liquid crystal display device with a polarizer louver 70. In the present comparative example, a biaxial retardation film providing a retardation of NZ 1.6/Re 260 nm was used as the biaxial retardation layer. Still, the biaxial retardation layer is not limited to this, and any retardation layer providing a Rth of 200 nm or more can be used.

Figure 23:
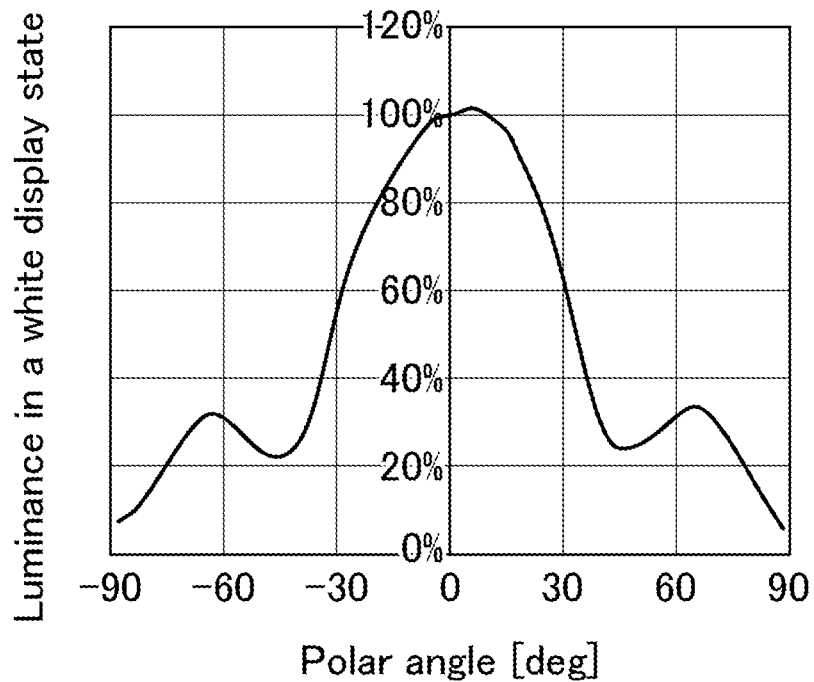
FIG. 23 is a chart showing a relation between the luminance in a white display state and the polar angle at the vertical azimuth of the liquid crystal display device of Comparative Example 2.

The liquid crystal display device 1R of Comparative Example 2 was evaluated in the same manner as in Comparative Example 1. The results are shown in Table 2 below and FIG. 23. FIG. 23 is a chart showing a relation between the luminance in a white display state and the polar angle at the vertical azimuth of the liquid crystal display device of Comparative Example 2. As shown in Table 2 and FIG. 23,

TABLE 1

| | | Comparative Example 1 |
|---|---|---|
| Outline of structure | | Normal prism sheet without polarizer louver |
| Haze of diffuser sheet provided between third polarizer and backlight | | — |
| Azimuth of ridge line of prism sheet (azimuthal angle of ridge line) | | 0° |
| Refractive index of prism sheet base material | | 1.58 |
| Shape of prism | Apex angle $\theta_t$ | 90° |
| | Base angle $\theta_{b1}$ | 45° |
| | Base angle $\theta_{b2}$ | 45° |
| Retardation introduced by biaxial retarder in polarizer louver | | — |
| White luminance light distribution | Local maximum value of side lobe (local maximum luminance) | 32.6% |
| | Local minimum value of side lobe (local minimum luminance) | 22.9% |
| | Local maximum value/local minimum value (local maximum luminance/local minimum luminance) | 1.427 |
| Property in front direction | White luminance [nit] | 1133 |
| | Black luminance [nit] | 0.741 |
| | Front CR | 1529 |
| | Percentage of front CR relative to Comparative Example 1 | 100% |
| Property in oblique direction | White luminance [nit] | 192 |
| | Black luminance [nit] | 0.703 |
| Azimutal angle: 45° | Oblique CR | 274 |
| Polar angle: 60° | Percentage of oblique CR relative to Comparative Example 1 | 100% |
| European OEM standard area A | Minimum white luminance in the area [nit] | 516 |
| | Minimum CR in the area | 705 |
| | Percentage of minimum CR in the area relative to CR standard value (> 650) in European OEM standard | 108% |

Comparative Example 2

Figure 22:
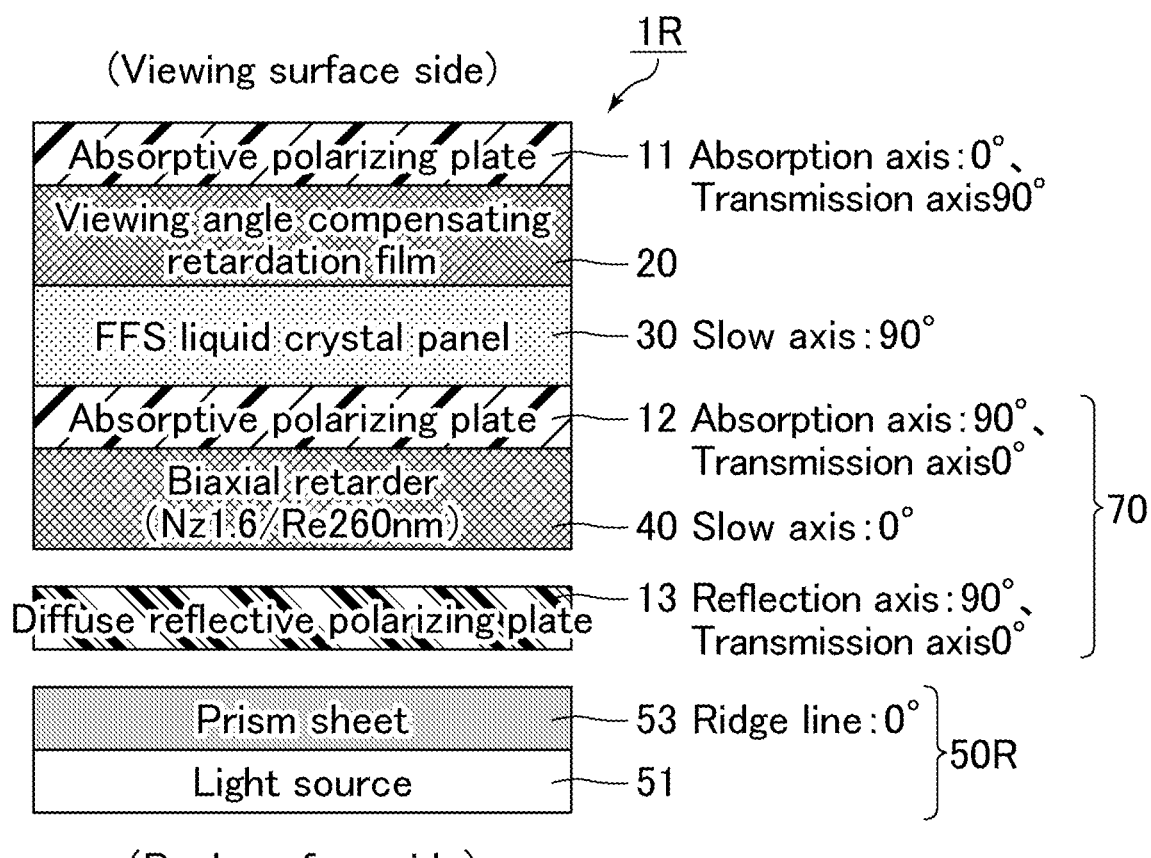
FIG. 22 is a schematic cross-sectional view of a liquid crystal display device of Comparative Example 2.

FIG. 22 is a schematic cross-sectional view of a liquid crystal display device of Comparative Example 2. A liquid crystal display device of Comparative Example 2 shown in FIG. 22 was produced. Specifically, a liquid crystal display device 1R of Comparative Example 2 was produced as in Comparative Example 1, except that a biaxial retardation the black luminance at the azimuthal angle of 45° and the polar angle of 60° was small, which means that light leakage in a black display state was small in Comparative Example 2. However, the oblique CR was as small as 92% as compared to Comparative Example 1. This is an issue in application of the polarizer louver. Similarly, the minimum CR within area A in OEM standards in Europe was also smaller than that of Comparative Example 1.

TABLE 2

| | Comparative Example 2 |
|---|---|
| Outline of structure | Normal prism sheet with polarizer louver |
| Haze of diffuser sheet provided between third polarizer and backlight | — |
| Azimuth of ridge line of prism sheet (azimuthal angle of ridge line) | 0° |
| Refractive index of prism sheet base material | 1.58 |
| Shape of prism    Apex angle $\theta_t$ | 90° |
| Base angle $\theta_{b1}$ | 45° |
| Base angle $\theta_{b2}$ | 45° |
| Retardation introduced by biaxial retarder in polarizer louver | NZ 1.6/Re 260 nm |
| White luminance light distribution    Local maximum value of side lobe (local maximum luminance) | 32.7% |
| Local minimum value of side lobe (local minimum luminance) | 22.5% |
| Local maximum value/local minimum value (local maximum luminance/local minimum luminance) | 1.453 |
| Property in front direction    White luminance [nit] | 1136 |
| Black luminance [nit] | 0.728 |
| Front CR | 1560 |
| Percentage of front CR relative to Comparative Example 1 | 102% |
| Property in oblique direction    White luminance [nit] | 148 |
| Black luminance [nit] | 0.590 |
| Azimutal angle: 45°    Oblique CR | 251 |
| Polar angle: 60°    Percentage of oblique CR relative to Comparative Example 1 | 92% |
| European OEM standard area A    Minimum white luminance in the area [nit] | 477 |
| Minimum CR in the area | 690 |
| Percentage of minimum CR in the area relative to CR standard value (>650) in European OEM standard | 106% |

Comparative Example 3

Figure 24:
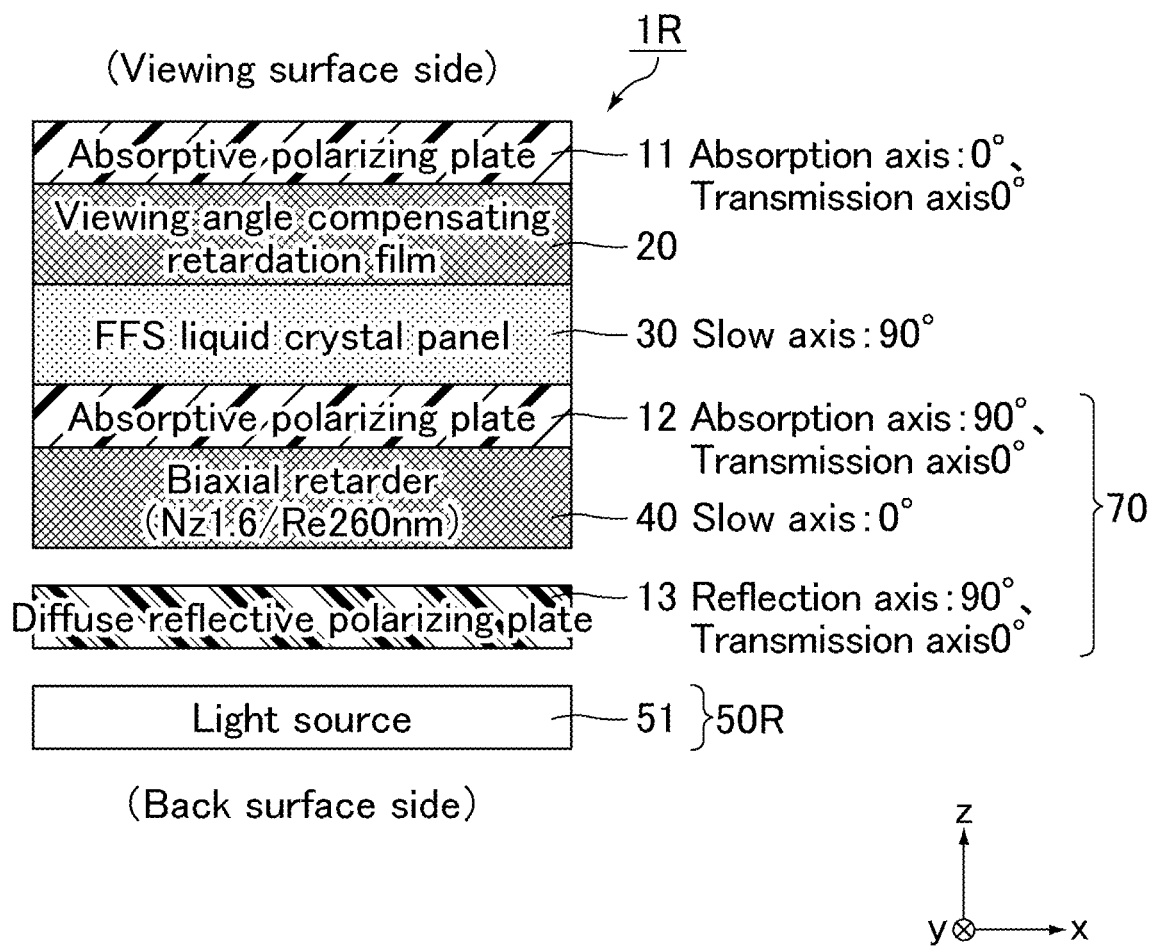
FIG. 24 is a schematic cross-sectional view of a liquid crystal display device of Comparative Example 3.

FIG. 24 is a schematic cross-sectional view of a liquid crystal display device of Comparative Example 3. A liquid crystal display device 1R of Comparative Example 3 shown in FIG. 24 was produced. The liquid crystal display device 1R of Comparative Example 3 was produced in the same manner as in Comparative Example 2, except that the prism sheet 53 was not provided.

Figure 25:
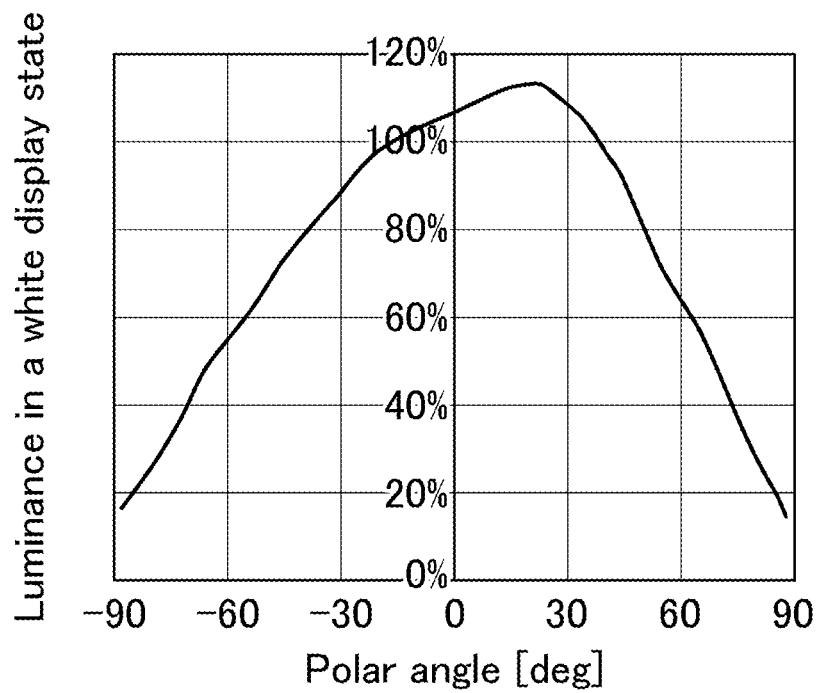
FIG. 25 is a chart showing a relation between the luminance in a white display state and the polar angle at the vertical azimuth of the liquid crystal display device of Comparative Example 3.

The liquid crystal display device 1R of Comparative Example 3 was evaluated in the same manner as in Comparative Example 1. The results are shown in Table 3 below and FIG. 25. FIG. 25 is a chart showing a relation between the luminance in a white display state and the polar angle at the vertical azimuth of the liquid crystal display device of Comparative Example 3. As shown in Table 3 and FIG. 25, it was confirmed that the side lobes derived from the prism sheet in the 90°-270° azimuthal angle direction disappeared due to the removal of the prism sheet in Comparative Example 3. In addition, the CR (oblique CR) at the azimuthal angle of 45° and the polar angle of 60°, which was the issue in Comparative Example 2, was 116% as compared to Comparative Example 1, which was higher than the results in Comparative Example 1 and Comparative Example 2. On the other hand, the front CR was greatly reduced to 85% as compared to Comparative Example 1. This is presumably because of the loss of the function given by the prism sheet to focus light emitted from the backlight in the front direction. It is generally known that the more oblique light in the light from the backlight is removed and the more light is focused in the front direction, the higher the front CR becomes.

TABLE 3

| | Comparative Example 3 |
|---|---|
| Outline of structure | Without prism sheet with polarizer louver |
| Haze of diffuser sheet provided between third polarizer and backlight | — |
| Azimuth of ridge line of prism sheet (azimuthal angle of ridge line) | — |
| Refractive index of prism sheet base material | — |
| Shape of prism    Apex angle $\theta_t$ | — |
| Base angle $\theta_{b1}$ | — |
| Base angle $\theta_{b2}$ | — |
| Retardation introduced by biaxial retarder in polarizer louver | NZ 1.6/Re 260 nm |
| White luminance light distribution    Local maximum value of side lobe (local maximum luminance) | No local maximum |
| Local minimum value of side lobe (local minimum luminance) | No local minimum |

TABLE 3-continued

|  |  | Comparative Example 3 |
|---|---|---|
|  | Local maximum value/local minimum value (local maximum luminance/local minimum luminance) | — |
| Property in front direction | White luminance [nit] | 780 |
|  | Black luminance [nit] | 0.599 |
|  | Front CR | 1302 |
|  | Percentage of front CR relative to Comparative Example 1 | 85% |
| Property in oblique direction Azimutal angle: 45° Polar angle: 60° | White luminance [nit] | 276 |
|  | Black luminance [nit] | 0.872 |
|  | Oblique CR | 316 |
|  | Percentage of oblique CR relative to Comparative Example 1 | 116% |
| European OEM standard area A | Minimum white luminance in the area [nit] | 530 |
|  | Minimum CR in the area | 777 |
|  | Percentage of minimum CR in the area relative to CR standard value (>650) in European OEM standard | 120% |

Example 1

Figure 26:
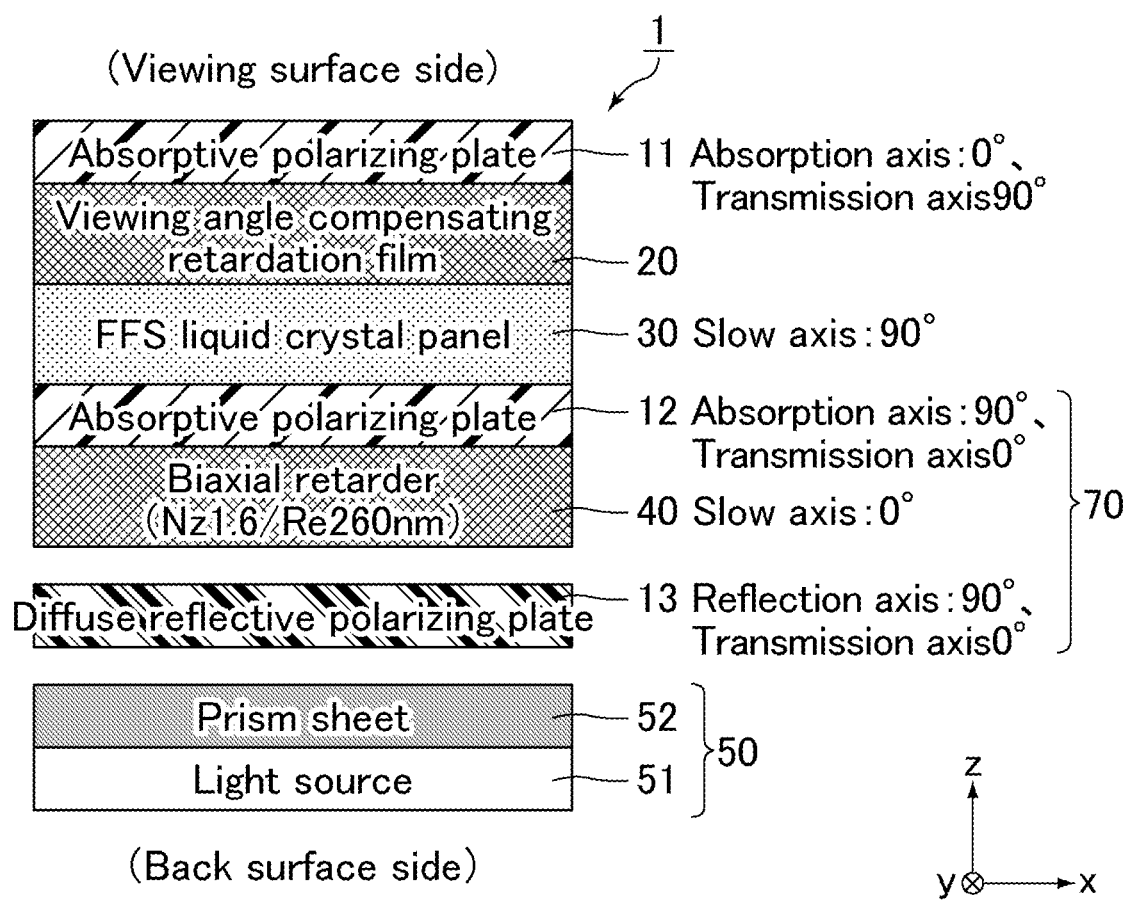
FIG. 26 is a schematic cross-sectional view of a liquid crystal display device of Example 1.
Figure 27:
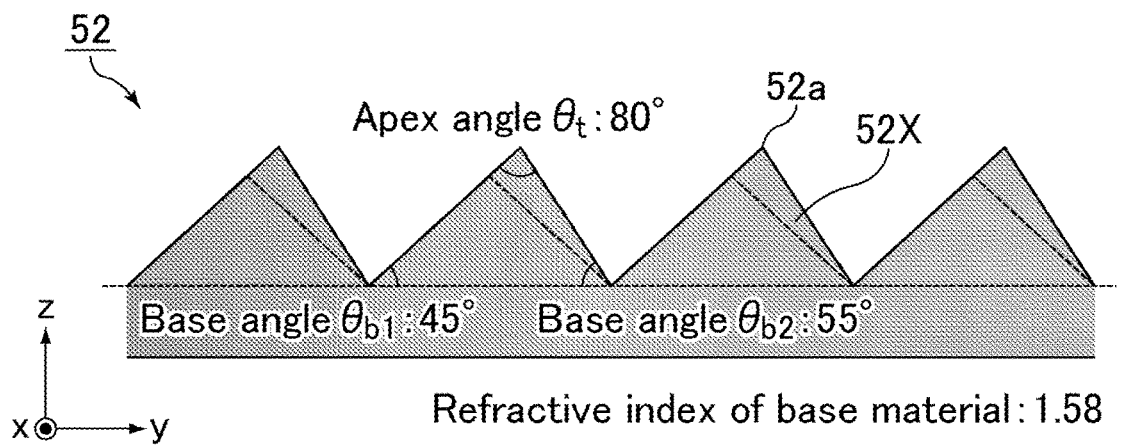
FIG. 27 is a schematic cross-sectional view of a prism sheet in the liquid crystal display device of Example 1.

FIG. 26 is a schematic cross-sectional view of a liquid crystal display device of Example 1. FIG. 27 is a schematic cross-sectional view of a prism sheet in the liquid crystal display device of Example 1. A liquid crystal display device of Example 1 shown in FIG. 26 was produced in the same manner as in Comparative Example 2, except that the prism sheet 53 in Comparative Example 2 was changed to a prism sheet 52 having a shape shown in FIG. 27. The liquid crystal display device 1 of Example 1 corresponds to the liquid crystal display device 1 of Embodiment 1. In Example 1, the cross-sectional shape of the prism 52X was changed to have an apex angle $\theta_t$ of 80°, a base angle $\theta_{b1}$ of 45°, and a base angle $\theta_{b2}$ of 55°, which is a shape deformed from a right isosceles triangle as shown in FIG. 27.

The liquid crystal display device 1 of Example 1 was evaluated in the same manner as in Comparative Example 1.

Figure 28:
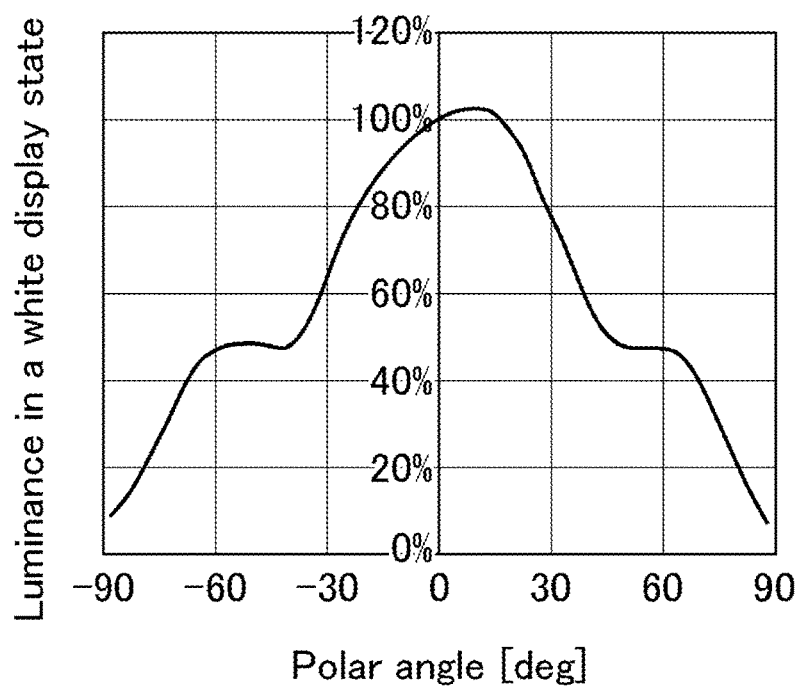
FIG. 28 is a chart showing a relation between the luminance in a white display state and the polar angle at the vertical azimuth of the liquid crystal display device of Example 1.

The results are shown in Table 4 below and FIG. 28. FIG. 28 is a chart showing a relation between the luminance in a white display state and the polar angle at the vertical azimuth of the liquid crystal display device of Example 1. As shown in Table 4 and FIG. 28, it was confirmed that the asymmetric prism shape of the prism sheet reduced side lobes derived from the prism sheet in Example 1. Specifically, the local maximum value/local minimum value of the side lobe was 1.427 in Comparative Example 1, whereas it was 1.032 in Example 1. Owing to this, the CR at an azimuthal angle of 45° and a polar angle of 60° was improved to 110% as compared to the CR in Comparative Example 1. The front CR was greatly decreased in Comparative Example 3 as compared to Comparative Example 1, whereas the front CR in Example 1 was 96% as compared to the front CR in Comparative Example 1, i.e., within a 5% decrease. The minimum CR in area A in OEM standards in Europe was also significantly improved over Comparative Example 1.

TABLE 4

|  |  | Example 1 |
|---|---|---|
| Outline of structure |  | Asymmetric prism sheet with polarizer louver |
| Haze of diffuser sheet provided between third polarizer and backlight |  | — |
| Azimuth of ridge line of prism sheet (azimuthal angle of ridge line) |  | 0° |
| Refractive index of prism sheet base material |  | 1.58 |
| Shape of prism | Apex angle $\theta_t$ | 80° |
|  | Base angle $\theta_{b1}$ | 45° |
|  | Base angle $\theta_{b2}$ | 55° |
| Retardation introduced by biaxial retarder in polarizer louver |  | NZ 1.6/Re 260 nm |
| White luminance light distribution | Local maximum value of side lobe (local maximum luminance) | 48.8% |
|  | Local minimum value of side lobe (local minimum luminance) | 47.2% |
|  | Local maximum value/local minimum value (local maximum luminance/local minimum luminance) | 1.032 |
| Property in front direction | White luminance [nit] | 930 |
|  | Black luminance [nit] | 0.633 |
|  | Front CR | 1470 |
|  | Percentage of front CR relative to Comparative Example 1 | 96% |

TABLE 4-continued

|  |  | Example 1 |
|---|---|---|
| Property in oblique direction | White luminance [nit] | 219 |
|  | Black luminance [nit] | 0.730 |
| Azimutal angle: 45° | Oblique CR | 301 |
| Polar angle: 60° | Percentage of oblique CR relative to Comparative Example 1 | 110% |
| European OEM standard area A | Minimum white luminance in the area [nit] | 488 |
|  | Minimum CR in the area | 762 |
|  | Percentage of minimum CR in the area relative to CR standard value (>650) in European OEM standard | 117% |

In order to study the case where a light beam is not emitted from the prism sheet and returns in the backlight direction (cases shown in FIG. 9 and FIG. 10) for each of the prism sheet used in Comparative Example 2 and the prism sheet used in Example 1, the incident angle $\theta_{in}$ satisfying $\theta_2=\theta_c$ and the incident angle $\theta_{in}$ satisfying $\theta_3=\theta_c$ were calculated. Similar calculations were also made for a prism sheet of a reference example in which the apex angle $\theta_t$, the base angle $\theta_{b1}$, and the base angle $\theta_{b2}$ were set as shown in Table 5 below. Table 5 shows the results. In Table 5, the difference between the incident angle $\theta_{in}$ satisfying $\theta_2=\theta_c$ and the incident angle $\theta_{in}$ satisfying $\theta_3=\theta_c$ was calculated as the light confinement angle range Δ.

|  | Refractive index of base material | Apex angle $\theta_t$ | Base angle $\theta_{b1}$ | Base angle $\theta_{b2}$ | $\theta_{in}$ satisfying $\theta_2 = \theta_c$ [deg] | $\theta_{in}$ satisfying $\theta_3 = \theta_c$ [deg] | Light confinement angle range Δ [deg] |
|---|---|---|---|---|---|---|---|
| Comparative Example 2 | 1.58 | 90 | 45 | 45 | 9.1 | −9.1 | 18.2 |
| Reference Example | 1.58 | 85 | 45 | 50 | 9.1 | −1.2 | 10.2 |
| Example 1 | 1.58 | 80 | 45 | 55 | 9.1 | 6.7 | 2.3 |

As the light confinement angle range Δ shown in Table 5 is larger, the ability to focus light in the front direction becomes higher and light that is not easily depolarized is more likely to be focused in the front direction. However, side lobe light, which is easily depolarized, is more likely to appear in an oblique direction. In other words, it was found that the larger the light confinement angle range Δ, the higher the front CR but the lower the oblique CR.

The light confinement angle range Δ is mostly determined by the magnitude of the apex angle $\theta_t$, and is smallest when the apex angle $\theta_t$ is 80° in Example 1 shown in Table 5. If the apex angle $\theta_t$ is less than 80°, light cannot be confined, leading to a significant decrease in front CR as compared to those of Comparative Example 1 and Comparative Example 2 (result similar to that of Comparative Example 3). Therefore, the prism 52X preferably has a cross-sectional shape with an apex angle $\theta_t$ of not smaller than 80° but smaller than 90° in the direction perpendicular to the ridge lines 52a in order to obtain the effect of improving the oblique CR and maintaining the front CR.

Example 2

Figure 29:
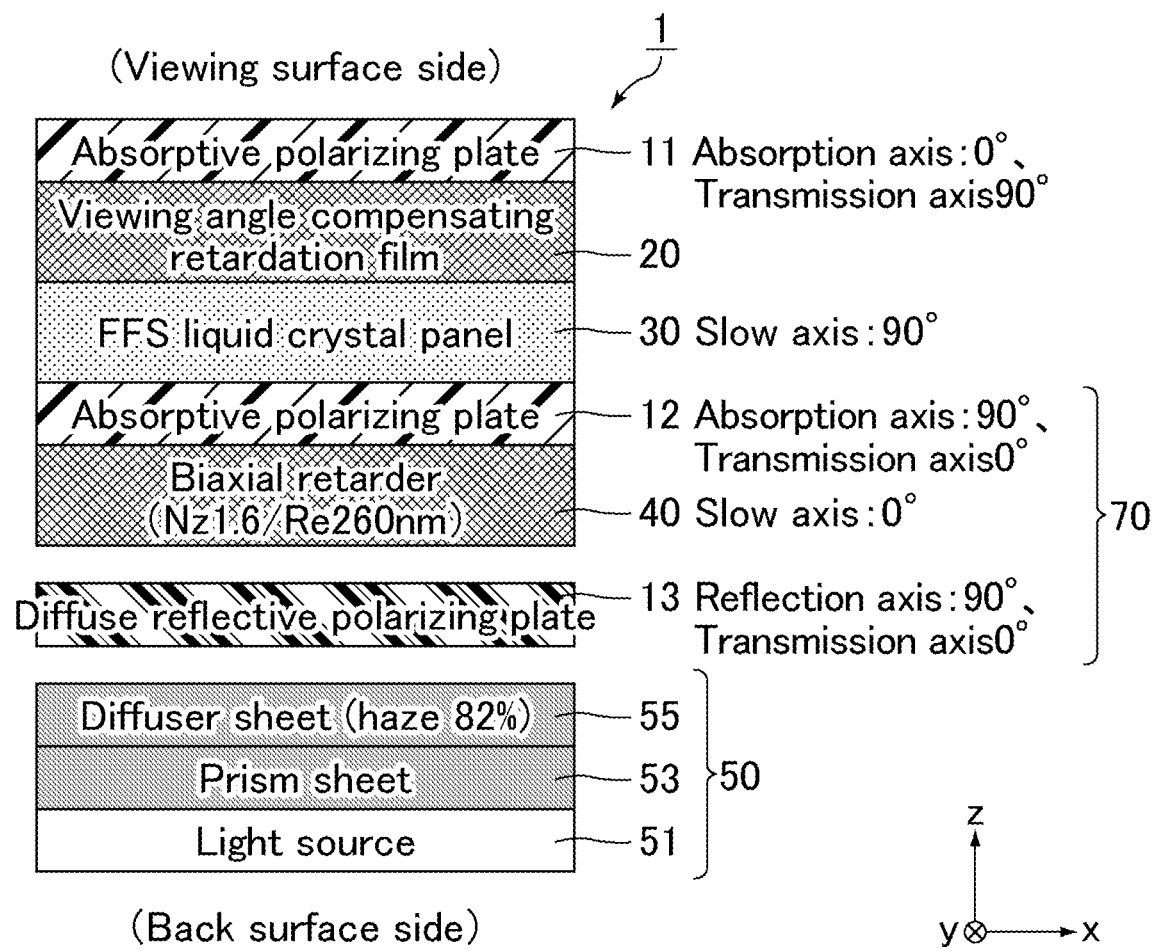
FIG. 29 is a schematic cross-sectional view of a liquid crystal display device of Example 2.

FIG. 29 is a schematic cross-sectional view of a liquid crystal display device of Example 2. A liquid crystal display device 1 of Example 2 shown in FIG. 29 was produced in the same manner as in Comparative Example 2, except that a diffuser sheet 55 with a haze of 82% was additionally provided between the prism sheet 53 and the diffuse reflective polarizing plate (third polarizer 13) in Comparative Example 2. The liquid crystal display device 1 of Example 2 corresponds to the liquid crystal display device 1 of Embodiment 2.

Figure 30:
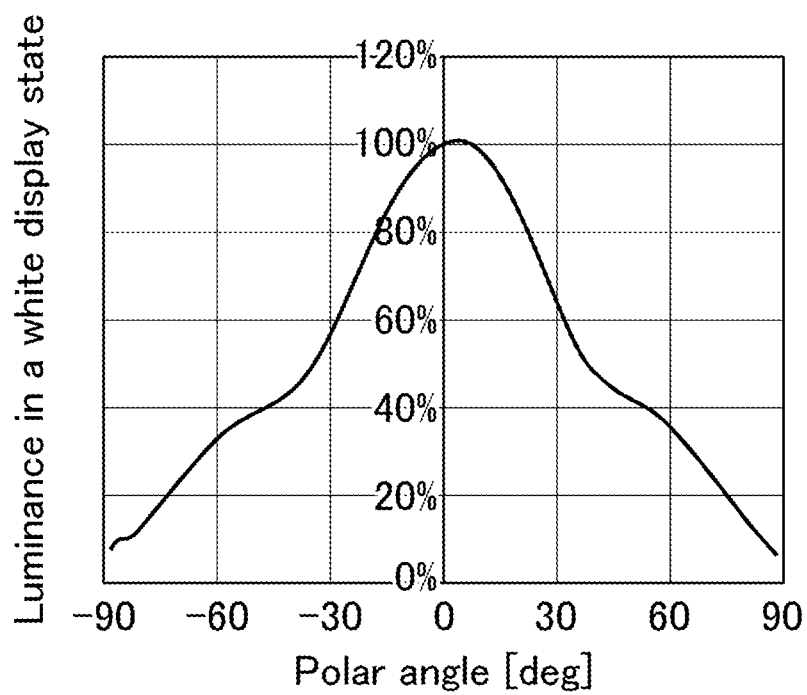
FIG. 30 is a chart showing a relation between the luminance in a white display state and the polar angle at the vertical azimuth of the liquid crystal display device of Example 2.

The liquid crystal display device 1 of Example 2 was evaluated in the same manner as in Comparative Example 1. The results are shown in Table 6 below and FIG. 30. FIG. 30 is a chart showing a relation between the luminance in a white display state and the polar angle at the vertical azimuth of the liquid crystal display device of Example 2. As shown in Table 6 and FIG. 30, it was confirmed that side lobes derived from the prism sheet disappeared in Example 2 owing to the addition of the diffuser sheet with a large haze. Owing to this, the CR at an azimuthal angle of 45° and a polar angle of 60° was improved to 114% as compared to the CR in Comparative Example 1. The front CR maintained a value equivalent to that in Comparative Example 1 without decreasing. The minimum CR in area A in OEM standards in Europe was also significantly improved over Comparative Example 1.

TABLE 6

| | Example 2 |
|---|---|
| Outline of structure | Normal prism sheet + diffuser sheet ① with polarizer louver |
| Haze of diffuser sheet provided between third polarizer and backlight | 82% |
| Azimuth of ridge line of prism sheet (azimuthal angle of ridge line) | 0° |
| Refractive index of prism sheet base material | 1.58 |
| Shape of prism   Apex angle $\theta_t$ | 90° |
|   Base angle $\theta_{b1}$ | 45° |
|   Base angle $\theta_{b2}$ | 45° |
| Retardation introduced by biaxial retarder in polarizer louver | NZ 1.6/Re 260 nm |
| White luminance light distribution   Local maximum value of side lobe (local maximum luminance) | No local maximum |
|   Local minimum value of side lobe (local minimum luminance) | No locam minimum |
|   Local maximum value/local minimum value (local maximum luminance/local minimum luminance) | — |
| Property in front direction   White luminance [nit] | 995 |
|   Black luminance [nit] | 0.651 |
|   Front CR | 1529 |
|   Percentage of front CR relative to Comparative Example 1 | 100% |
| Property in oblique direction   White luminance [nit] | 286 |
| Azimutal angle: 45°   Black luminance [nit] | 0.917 |
| Polar angle: 60°   Oblique CR | 312 |
|   Percentage of oblique CR relative to Comparative Example 1 | 114% |
| European OEM standard area A   Minimum white luminance in the area [nit] | 513 |
|   Minimum CR in the area | 790 |
|   Percentage of minimum CR in the area relative to CR standard value (> 650) in European OEM standard | 122% |

Example 3

Figure 31:
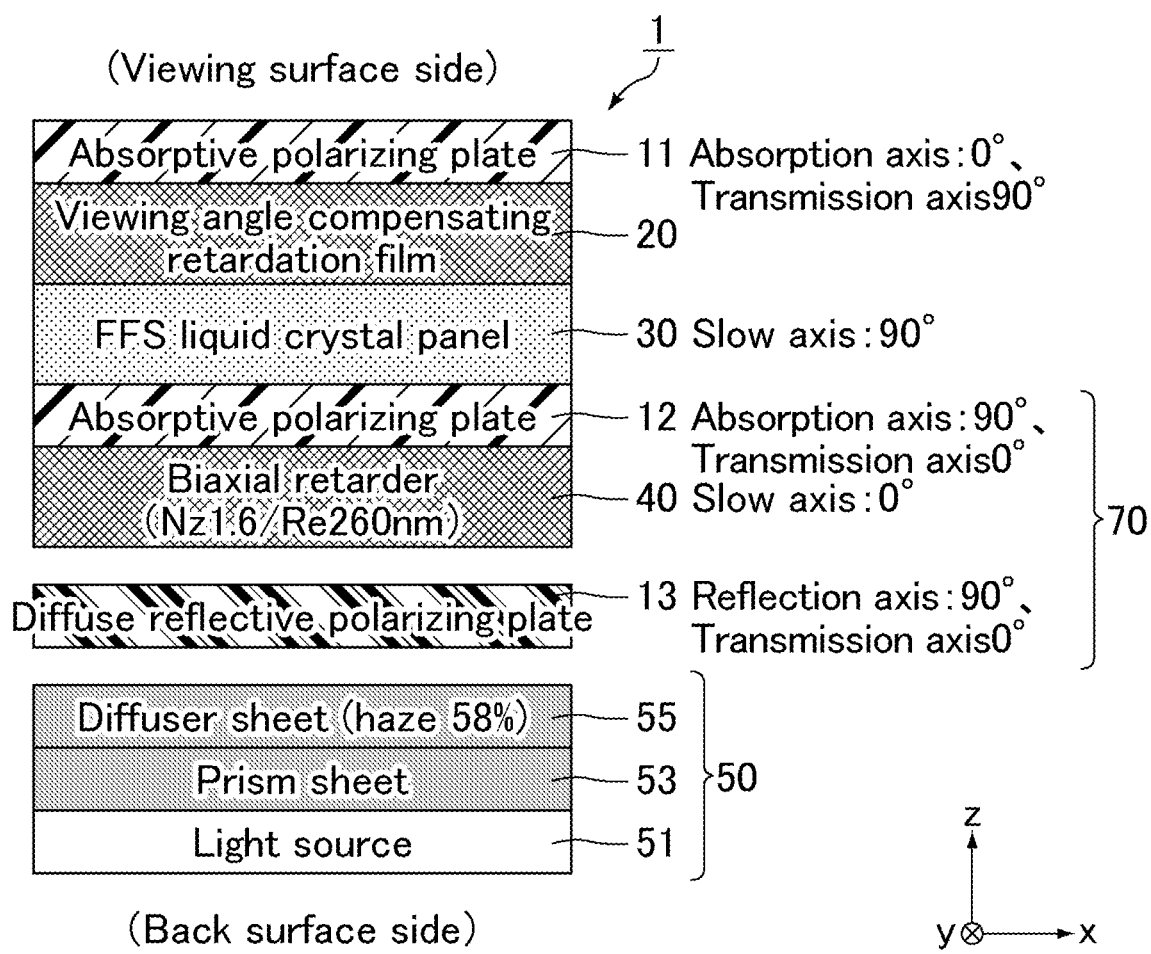
FIG. 31 is a schematic cross-sectional view of a liquid crystal display device of Example 3.

FIG. 31 is a schematic cross-sectional view of a liquid crystal display device of Example 3. A liquid crystal display device 1 of Example 3 shown in FIG. 31 was produced in the same manner as in Comparative Example 2, except that a diffuser sheet 55 with a haze of 58% was additionally provided between the prism sheet 53 and the diffuse reflective polarizing plate (third polarizer 13) in Comparative Example 2. The liquid crystal display device 1 of Example 3 corresponds to the liquid crystal display device 1 of Embodiment 2.

Figure 32:
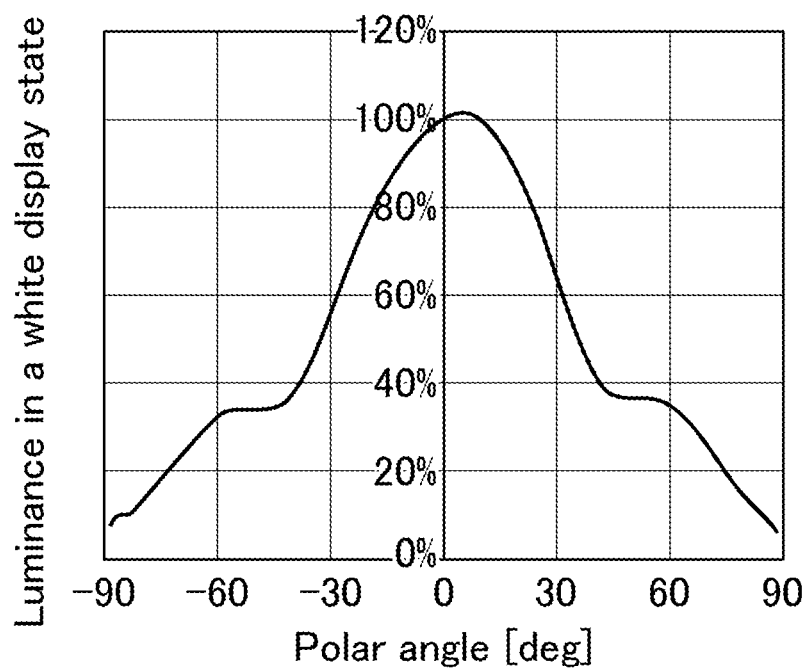
FIG. 32 is a chart showing a relation between the luminance in a white display state and the polar angle at the vertical azimuth of the liquid crystal display device of Example 3.

The liquid crystal display device 1 of Example 3 was evaluated in the same manner as in Comparative Example 1. The results are shown in Table 7 below and FIG. 32. FIG. 32 is a chart showing a relation between the luminance in a white display state and the polar angle at the vertical azimuth of the liquid crystal display device of Example 3. As shown in Table 7 and FIG. 32, it was confirmed that since the haze of the diffuser sheet was smaller than that of Example 2, side lobes derived from the prism sheet was slightly present in Example 3. The CR at an azimuthal angle of 45° and a polar angle of 60° was increased to 111% as compared to the CR in Comparative Example 1 but slightly inferior to 114% in Example 1. On the other hand, the front CR was slightly improved to 101% as compared to the front CR in Comparative Example 1 and slightly superior to 100% in Example 1. Addition of the diffuser sheet with an appropriately small haze improved both the front CR and the oblique CR in a well-balanced manner as compared to the normal liquid crystal display device of Comparative Example 1. The minimum CR in area A in OEM standards in Europe was also significantly improved over Comparative Example 1.

TABLE 7

| | Example 3 |
|---|---|
| Outline of structure | Normal prism sheet + diffuser sheet ② with polarizer louver |
| Haze of diffuser sheet provided between third polarizer and backlight | 58% |
| Azimuth of ridge line of prism sheet (azimuthal angle of ridge line) | 0° |
| Refractive index of prism sheet base material | 1.58 |
| Shape of prism   Apex angle $\theta_t$ | 90° |
|   Base angle $\theta_{b1}$ | 45° |
|   Base angle $\theta_{b2}$ | 45° |

TABLE 7-continued

|  |  | Example 3 |
|---|---|---|
| Retardation introduced by biaxial retarder in polarizer louver | | NZ 1.6/Re 260 nm |
| White luminance light distribution | Local maximum value of side lobe (local maximum luminance) | 34.1% |
|  | Local minimum value of side lobe (local minimum luminance) | 33.8% |
|  | Local maximum value/local minimum value (local maximum luminance/local minimum luminance) | 1.007 |
| Property in front direction | White luminance [nit] | 1054 |
|  | Black luminance [nit] | 0.682 |
|  | Front CR | 1546 |
|  | Percentage of front CR relative to Comparative Example 1 | 101% |
| Property in oblique direction Azimutal angle: 45° Polar angle: 60° | White luminance [nit] | 248 |
|  | Black luminance [nit] | 0.818 |
|  | Oblique CR | 303 |
|  | Percentage of oblique CR relative to Comparative Example 1 | 111% |
| European OEM standard area A | Minimum white luminance in the area [nit] | 514 |
|  | Minimum CR in the area | 763 |
|  | Percentage of minimum CR in the area relative to CR standard value (>650) in European OEM standard | 117% |

Example 4

Figure 33:
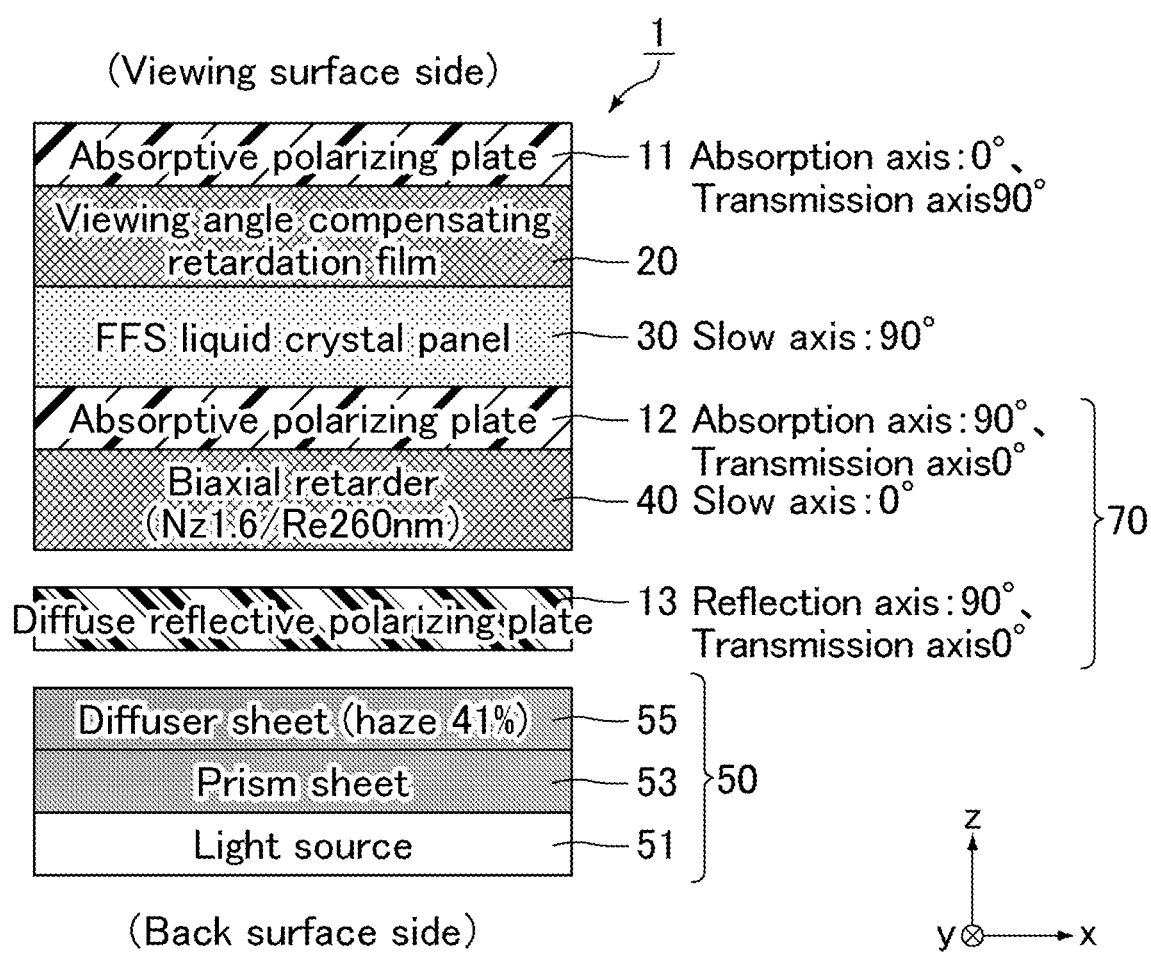
FIG. 33 is a schematic cross-sectional view of a liquid crystal display device of Example 4.

FIG. 33 is a schematic cross-sectional view of a liquid crystal display device of Example 4. A liquid crystal display device 1 of Example 4 shown in FIG. 33 was produced in the same manner as in Comparative Example 2, except that a diffuser sheet 55 with a haze of 41% was additionally provided between the prism sheet 53 and the diffuse reflective polarizing plate (third polarizer 13) in Comparative Example 2. The liquid crystal display device 1 of Example 4 corresponds to the liquid crystal display device 1 of Embodiment 2.

The liquid crystal display device 1 of Example 4 was evaluated in the same manner as in Comparative Example 1.

Figure 34:
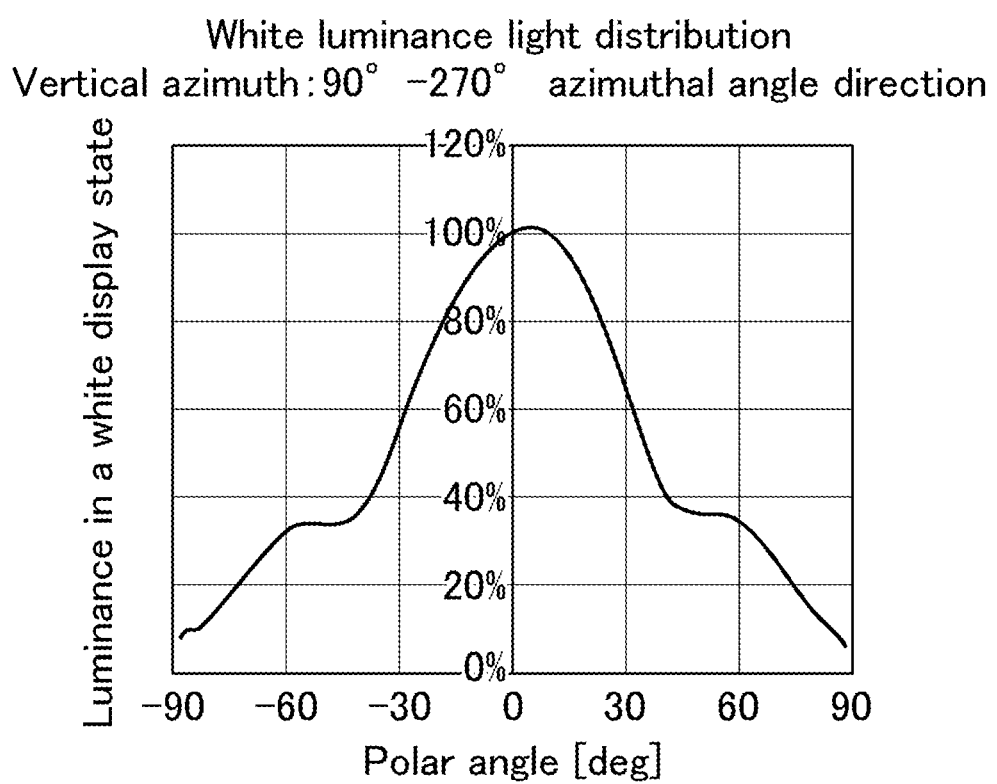
FIG. 34 is a chart showing a relation between the luminance in a white display state and the polar angle at the vertical azimuth of the liquid crystal display device of Example 4.

The results are shown in Table 8 below and FIG. 34. FIG. 34 is a chart showing a relation between the luminance in a white display state and the polar angle at the vertical azimuth of the liquid crystal display device of Example 4. As shown in Table 8 and FIG. 34, both the front CR and the oblique CR in Example 4 were improved as in Example 3, compared to Comparative Example 1. In more detailed examination of the results, the front CR was slightly improved and the oblique CR was slightly lowered as compared to those in Example 3 because the haze of the diffuser sheet was smaller than that of Example 3. The minimum CR in area A in OEM standards in Europe was also significantly improved over Comparative Example 1.

TABLE 8

|  |  | Example 4 |
|---|---|---|
| Outline of structure | | Normal prism sheet + diffuser sheet ③ with polarizer louver |
| Haze of diffuser sheet provided between third polarizer and backlight | | 41% |
| Azimuth of ridge line of prism sheet (azimuthal angle of ridge line) | | 0° |
| Refractive index of prism sheet base material | | 1.58 |
| Shape of prism | Apex angle $\theta_t$ | 90° |
|  | Base angle $\theta_{b1}$ | 45° |
|  | Base angle $\theta_{b2}$ | 45° |
| Retardation introduced by biaxial retarder in polarizer louver | | NZ 1.6/Re 260 nm |
| White luminance light distribution | Local maximum value of side lobe (local maximum luminance) | 30.7% |
|  | Local minimum value of side lobe (local minimum luminance) | 29.0% |
|  | Local maximum value/local minimum value (local maximum luminance/local minimum luminance) | 1.057 |
| Property in front direction | White luminance [nit] | 1050 |
|  | Black luminance [nit] | 0.677 |
|  | Front CR | 1550 |
|  | Percentage of front CR relative to Comparative Example 1 | 101% |
| Property in oblique direction Azimutal angle: 45° Polar angle: 60° | White luminance [nit] | 214 |
|  | Black luminance [nit] | 0.708 |
|  | Oblique CR | 302 |
|  | Percentage of oblique CR relative to Comparative Example 1 | 110% |

TABLE 8-continued

|  |  | Example 4 |
| --- | --- | --- |
| European OEM standard area A | Minimum white luminance in the area [nit] | 522 |
|  | Minimum CR in the area | 755 |
|  | Percentage of minimum CR in the area relative to CR standard value (> 650) in European OEM standard | 116% |

Example 5

Figure 35:
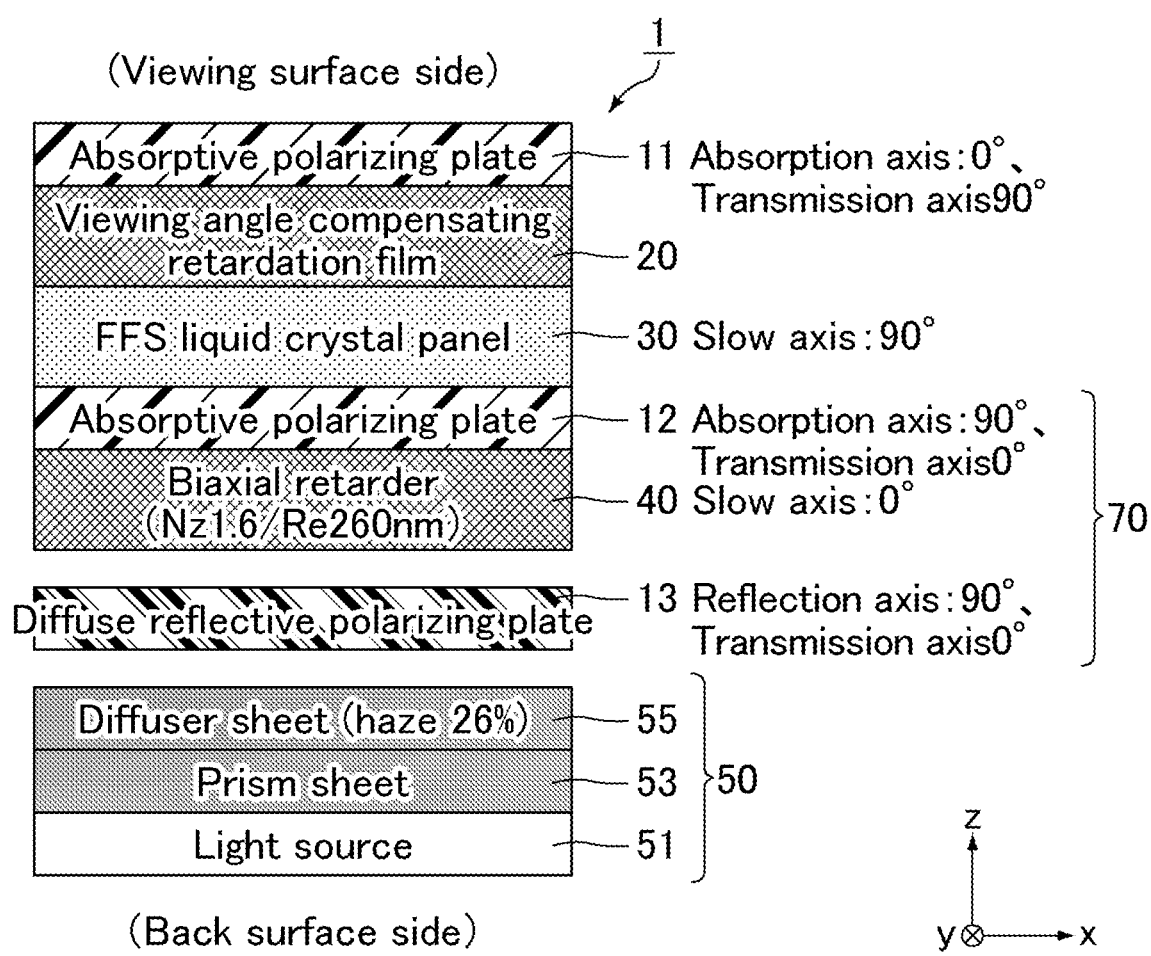
FIG. 35 is a schematic cross-sectional view of a liquid crystal display device of Example 5.

FIG. 35 is a schematic cross-sectional view of a liquid crystal display device of Example 5. A liquid crystal display device 1 of Example 5 shown in FIG. 35 was produced in the same manner as in Comparative Example 2, except that a diffuser sheet 55 with a haze of 26% was additionally provided between the prism sheet 53 and the diffuse reflective polarizing plate (third polarizer 13) in Comparative Example 2. The liquid crystal display device 1 of Example 5 corresponds to the liquid crystal display device 1 of Embodiment 2.

Figure 36:
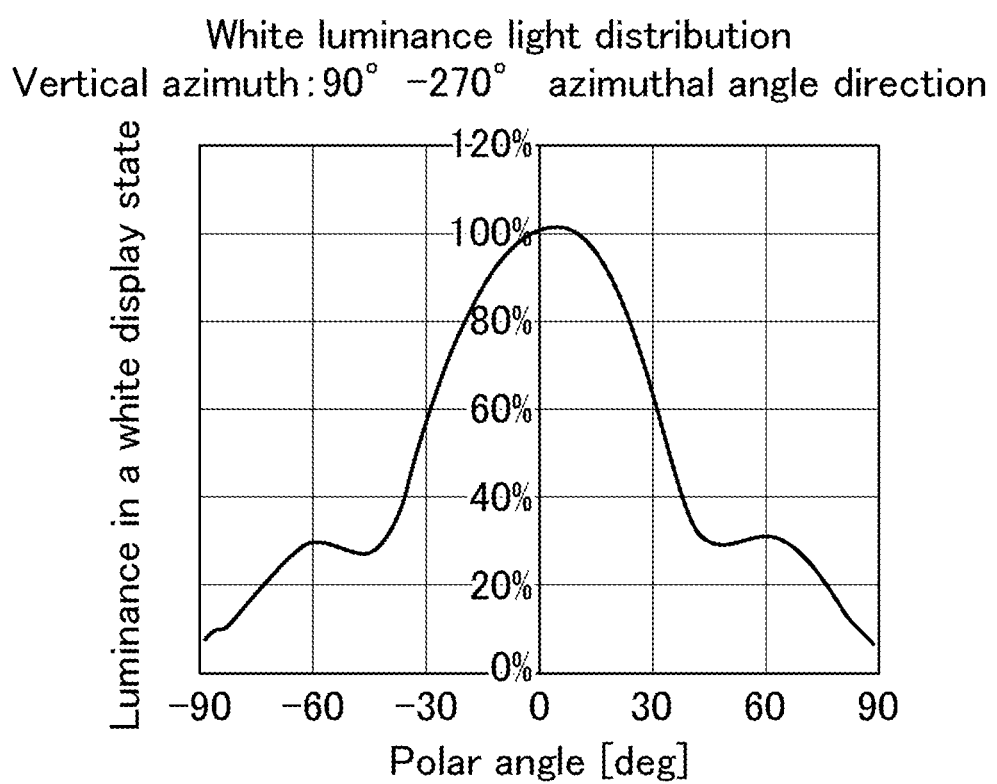
FIG. 36 is a chart showing a relation between the luminance in a white display state and the polar angle at the vertical azimuth of the liquid crystal display device of Example 5.

The liquid crystal display device 1 of Example 5 was evaluated in the same manner as in Comparative Example 1. The results are shown in Table 9 below and FIG. 36. FIG. 36 is a chart showing a relation between the luminance in a white display state and the polar angle at the vertical azimuth of the liquid crystal display device of Example 5. As shown in Table 9 and FIG. 36, both the front CR and the oblique CR in Example 5 were improved as in Example 4, compared to Comparative Example 1. In more detailed examination of the results, the front CR was slightly improved and the oblique CR was slightly lowered as compared to those in Example 4 because the haze of the diffuser sheet was smaller than that of Example 4. The minimum CR in area A in OEM standards in Europe was also significantly improved over Comparative Example 1.

TABLE 9

|  |  | Example 5 |
| --- | --- | --- |
| Outline of structure |  | Normal prism sheet + diffuser sheet ④ with polarizer louver |
| Haze of diffuser sheet provided between third polarizer and backlight |  | 26% |
| Azimuth of ridge line of prism sheet (azimuthal angle of ridge line) |  | 0° |
| Refractive index of prism sheet base material |  | 1.58 |
| Shape of prism | Apex angle $\theta_t$ | 90° |
|  | Base angle $\theta_{b1}$ | 45° |
|  | Base angle $\theta_{b2}$ | 45° |
| Retardation introduced by biaxial retarder in polarizer louver |  | NZ 1.6/Re 260 nm |
| White luminance light distribution | Local maximum value of side lobe (local maximum luminance) | 30.1% |
|  | Local minimum value of side lobe (local minimum luminance) | 27.1% |
|  | Local maximum value/local minimum value (local maximum luminance/local minimum luminance) | 1.111 |
| Property in front direction | White luminance [nit] | 1063 |
|  | Black luminance [nit] | 0.686 |
|  | Front CR | 1551 |
|  | Percentage of front CR relative to Comparative Example 1 | 101% |
| Property in oblique direction Azimutal angle: 45° Polar angle: 60° | White luminance [nit] | 213 |
|  | Black luminance [nit] | 0.710 |
|  | Oblique CR | 300 |
|  | Percentage of oblique CR relative to Comparative Example 1 | 109% |
| European OEM standard area A | Minimum white luminance in the area [nit] | 531 |
|  | Minimum CR in the area | 750 |
|  | Percentage of minimum CR in the area relative to CR standard value (>650) in European OEM standard | 115% |

From Examples 1 to 5 and Comparative Examples 1 to 3 above, it was confirmed that the oblique CR when a polarizer louver is applied can be improved by the use of a special prism sheet that focuses less light than the lens sheet used normally (Example 1) or addition of a diffuser sheet (Examples 2 to 5) in order to reduce side lobe light which is an unnecessary light component. Complete elimination of side lobes as in Example 2 is preferred. In actual, even if the side lobe-like shapes are observed in the chart, the oblique CR is found to be improved when the ratio of the local maximum value to the local minimum value of the luminance of the side lobes is close to 1.00. (1.35 or less from the results of Examples 1 to 5). Comparative Example 3 shows that removal of the prism sheet eliminates the side lobes derived from the prism sheet and certainly improves the oblique CR but undesirably greatly lowers the front CR.

As for Examples 1 to 5 and Comparative Examples 1 to 3 above, Table 10 collectively shows the value obtained by dividing the local maximum value of the side lobe by the local minimum value of the side lobe (local maximum value/local minimum value), the haze of the diffuser sheet, the oblique CR, the front CR, and the front luminance. The oblique CR refers to the CR at an azimuthal angle of 45° and a polar angle of 60°.

TABLE 10

|  | Local maximum/ local minimum | Haze | Oblique CR | Front CR | Front luminance |
|---|---|---|---|---|---|
| Comparative Example 1 | 1.427 | 0% | 100% | 100% | 100% |
| Comparative Example 2 | 1.453 | 0% | 92% | 102% | 100% |
| Comparative Example 3 | 0.000 | 0% | 116% | 85% | 69% |
| Example 1 | 1.032 | 0% | 110% | 96% | 82% |
| Example 2 | 0.000 | 82% | 114% | 100% | 88% |
| Example 3 | 1.007 | 58% | 111% | 101% | 93% |
| Example 4 | 1.057 | 41% | 110% | 101% | 93% |
| Example 5 | 1.111 | 26% | 109% | 101% | 94% |

Figure 37:
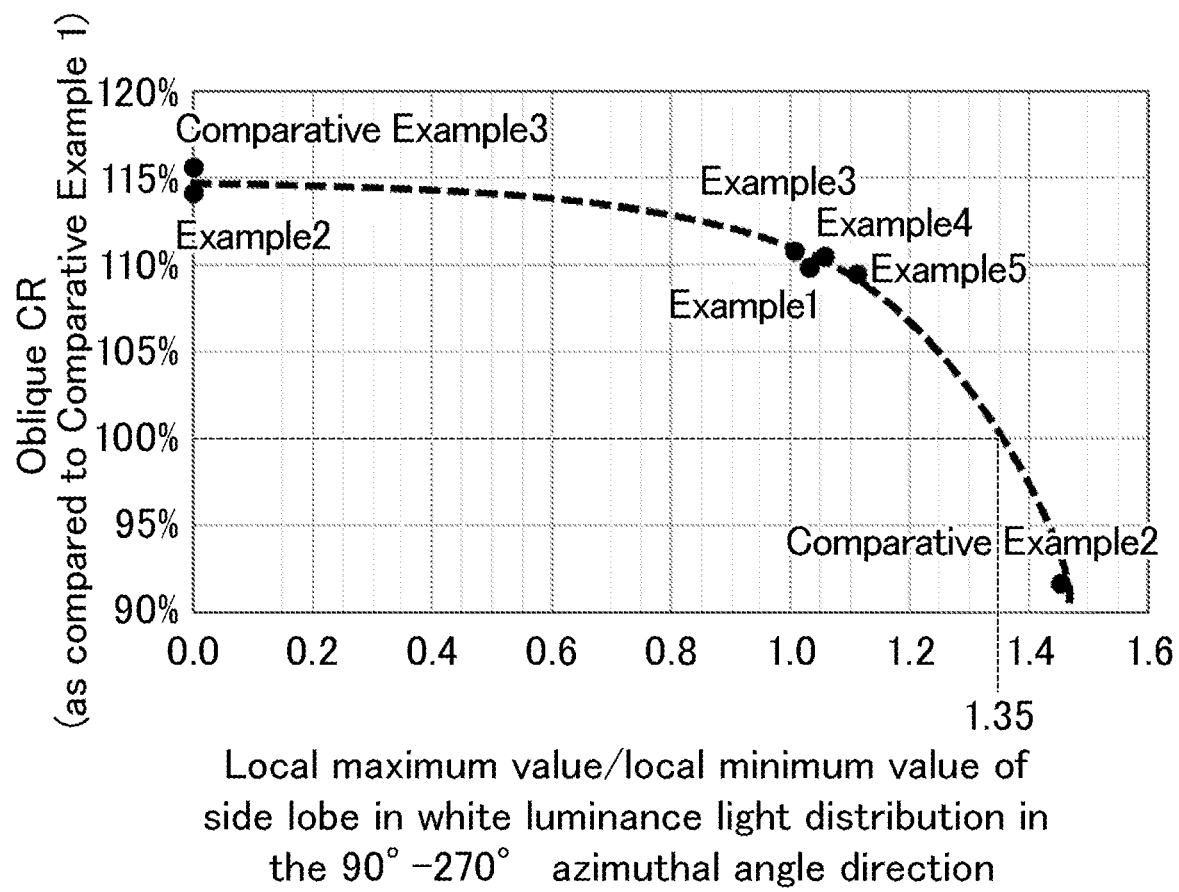
FIG. 37 is a graph plotted between the oblique CR versus the local maximum value/local minimum value of a side lobe.

FIG. 37 shows the result obtained by plotting the results of Examples 1 to 5 and Comparative Examples 2 and 3, with the local maximum value/local minimum value of the side lobe in Table 10 on the horizontal axis and the oblique CR in Table 10 on the vertical axis. The oblique CR was normalized with the oblique CR of Comparative Example 1 set to 100%. FIG. 37 is a graph plotted between the oblique CR versus the local maximum value/local minimum value of a side lobe. As shown in FIG. 37, it was found that the oblique CR can be improved when the local maximum value/local minimum value of the side lobe is 1.35 or less.

Figure 38:
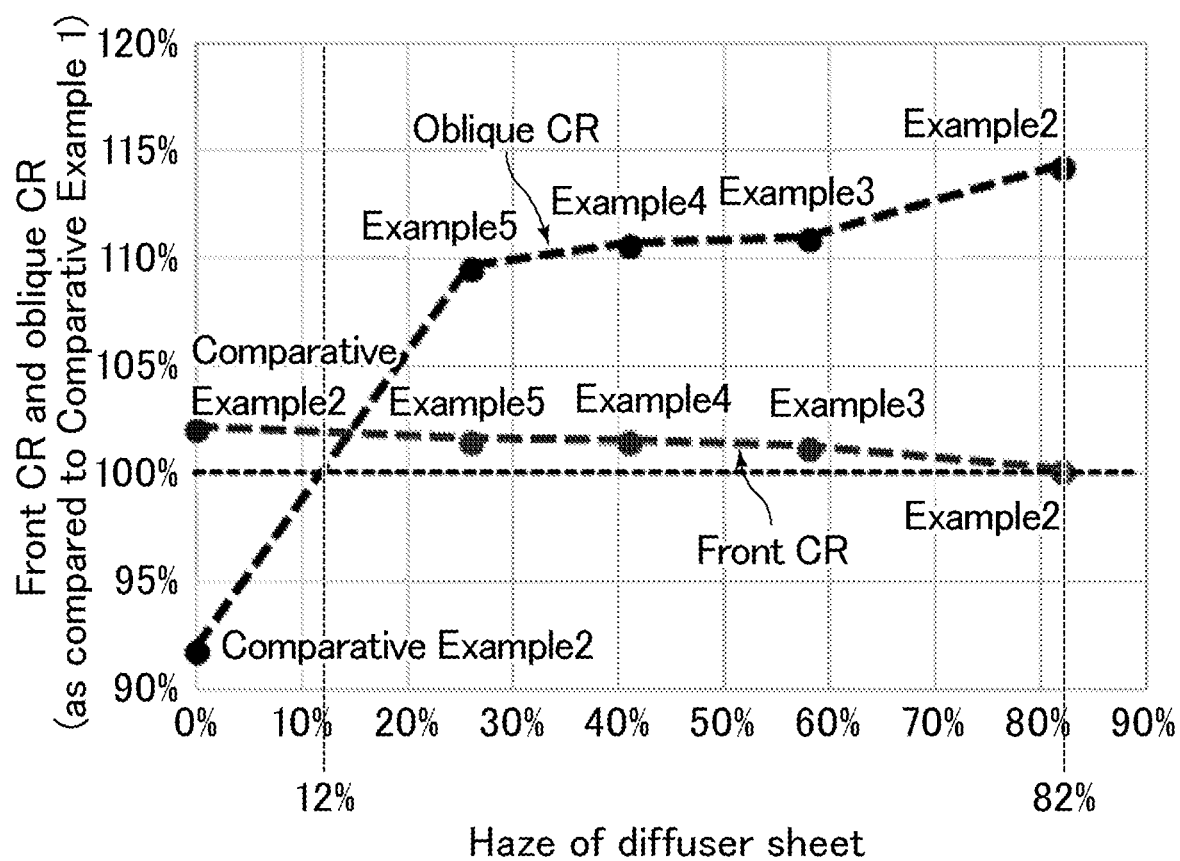
FIG. 38 is a graph plotted between the front CR and oblique CR versus the haze value of a diffuser sheet.

FIG. 38 shows the result obtained by plotting the results of Comparative Example 2 and Examples 2 to 5, with the haze of the diffuser sheet in Table 10 on the horizontal axis and the front CR and oblique CR in Table 10 on the vertical axis. FIG. 38 is a graph plotted between the front CR and oblique CR versus the haze value of a diffuser sheet. As shown in FIG. 38, it was found that when a diffuser sheet is provided as in Examples 2 to 5, the haze of the diffuser sheet is preferably 12% or higher and 82% or lower.

REFERENCE SIGNS LIST 1, 1R: liquid crystal display device
1PA, 2PA: local maximum point
1PB: local minimum point
1W, L, S: width
11: first polarizer
12: second polarizer
13: third polarizer
20: viewing angle compensating retardation film
21: viewing surface side biaxial retarder
22: positive C plate
30: liquid crystal panel
40: back surface side biaxial retarder
50, 50R: backlight
51: light source
52, 53: prism sheet
52a, 53a: ridge line
52X, 53X: prism
55: diffuser sheet
61: first alignment film
62: second alignment film
70: polarizer louver
100: thin-film transistor (TFT) substrate
101: gate line
101G: gate electrode
102: source line
102D: drain electrode
102S: source electrode
103: thin-film semiconductor layer
104: thin-film transistor (TFT)
104CH: contact hole
110, 210: supporting substrate
120: gate insulating film
130: source line layer
140: source insulating film
150, 240: planarizing film
160: common electrode
170: interlayer insulating film
170W: film thickness
180: pixel electrode (signal electrode)
200: color filter (CF) substrate
220: black matrix layer
230: color filter (CF) layer
230B: blue color filter
230G: green color filter
230R: red color filter
300: liquid crystal layer
300W: cell gap

What is claimed is:

1. A liquid crystal display device sequentially comprising from a viewing surface side towards a back surface side:
a first polarizer having a first transmission axis;
a liquid crystal panel;
a second polarizer having a second transmission axis;
a biaxial retarder having a slow axis parallel to the second transmission axis;
a third polarizer having a third transmission axis parallel to the second transmission axis; and
a backlight comprising a light source and a prism sheet disposed closer to the viewing surface side than the light source is,
wherein the prism sheet includes prisms arranged in multiple columns on a surface close to the viewing surface side, and
the liquid crystal display device has a light diffusion property curve having no side lobe or having a side lobe satisfying a ratio of a local maximum luminance to a local minimum luminance of 1.35 or less, the light diffusion property curve being obtained by plotting a luminance in a white display state in a direction perpendicular to ridge lines of the prisms against a polar angle.

2. The liquid crystal display device according to claim 1, wherein the ridge lines of the prisms have an azimuthal angle of 0°±3° where a direction parallel to the slow axis of the biaxial retarder is set to have an azimuthal angle of 0°.

3. The liquid crystal display device according to claim 1, wherein the prisms each have a triangular cross-sectional shape having an apex angle close to the viewing surface side and a pair of base angles close to the back surface side in a direction perpendicular to the ridge lines, and the apex angle is not smaller than 80° but smaller than 90°.

4. The liquid crystal display device according to claim 1, wherein the backlight further comprises a diffuser sheet disposed closer to the viewing surface side than the prism sheet is.

5. The liquid crystal display device according to claim 4, wherein the diffuser sheet has a haze of 12% or higher and 85% or lower.

\* \* \* \* \*